(12) United States Patent
Liu et al.

(10) Patent No.: US 10,778,297 B2
(45) Date of Patent: Sep. 15, 2020

(54) SIGNAL TRANSMISSION METHOD AND APPARATUS

(71) Applicant: HUAWEI TECHNOLOGIES CO.,LTD., Shenzhen, Guangdong (CN)

(72) Inventors: Kunpeng Liu, Beijing (CN); Leiming Zhang, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/272,428

(22) Filed: Feb. 11, 2019

(65) Prior Publication Data

US 2019/0173539 A1  Jun. 6, 2019

Related U.S. Application Data

(63) Continuation of application No. 15/382,206, filed on Dec. 16, 2016, now Pat. No. 10,205,497, which is a
(Continued)

(51) Int. Cl.
*H04B 7/0456* (2017.01)
*H04B 7/0417* (2017.01)
(Continued)

(52) U.S. Cl.
CPC .......... *H04B 7/0473* (2013.01); *H04B 7/04* (2013.01); *H04B 7/0417* (2013.01); *H04B 7/063* (2013.01);
(Continued)

(58) Field of Classification Search
CPC ..... H04L 5/0048; H04L 5/0053; H04W 24/10
See application file for complete search history.

(56) References Cited

U.S. PATENT DOCUMENTS 9,042,475 B2 * 5/2015 Kang ................... H04B 7/0634
375/267
9,608,785 B2  3/2017 Kim et al.
(Continued)

FOREIGN PATENT DOCUMENTS

CN    102088429 A    6/2011
CN    102281086 A    12/2011
(Continued)

OTHER PUBLICATIONS

XP050418348 R1-100050 Ericsson, ST-Ericsson,"Layer-to-DM RS port mapping for LTE-Advanced",3GPP TSG-RAN WG1 #59bis,Valencia, Spain, Jan. 18-22, 2010,total 5 pages.
(Continued)

*Primary Examiner* — Chandrahas B Patel
(74) *Attorney, Agent, or Firm* — Leydig, Voit & Mayer, Ltd.

(57) ABSTRACT

A signal transmission method, system and device are described. When measuring a reference signal and determining channel quality, a user equipment (UE) obtains a difference between codeword-to-CSI-RS mapping relationships by using a channel quality measurement model. The UE, using a measurement, calculates an optimized mapping relationship. The UE determines at least one mapping relationship from the mapping relationships, to adjust a codeword-to-CSI-RS mapping relationship of a channel.

14 Claims, 5 Drawing Sheets

Related U.S. Application Data continuation of application No. PCT/CN2015/081715, filed on Jun. 17, 2015.

(51) Int. Cl.
- *H04B 7/06* (2006.01)
- *H04L 1/06* (2006.01)
- *H04B 7/04* (2017.01)
- *H04L 1/00* (2006.01)

(52) U.S. Cl.
CPC ......... *H04B 7/0626* (2013.01); *H04B 7/0632* (2013.01); *H04L 1/0026* (2013.01); *H04L 1/06* (2013.01)

(56) References Cited

U.S. PATENT DOCUMENTS

| | | |
|---|---|---|
| 9,681,482 B2 | 6/2017 | Yang et al. |
| 2012/0300709 A1 | 11/2012 | Su et al. |
| 2013/0003812 A1 | 1/2013 | Collotta et al. |
| 2013/0100935 A1 | 4/2013 | Zhou et al. |
| 2013/0148515 A1 | 6/2013 | Ribeiro et al. |
| 2014/0010321 A1 | 1/2014 | Kang et al. |
| 2014/0072070 A1 | 3/2014 | Chung et al. |
| 2014/0219228 A1 | 8/2014 | Yeon et al. |
| 2015/0264700 A1 | 9/2015 | Li et al. |

FOREIGN PATENT DOCUMENTS

| | | |
|---|---|---|
| CN | 102291212 A | 12/2011 |
| CN | 102881086 A | 1/2013 |
| CN | 103503328 A | 1/2014 |
| CN | 103763071 A | 4/2014 |
| EP | 2690797 A1 | 1/2014 |
| EP | 2753013 A1 | 7/2014 |
| JP | 2011515915 A | 5/2011 |
| JP | 2013507820 A | 3/2013 |
| JP | 2014510490 A | 4/2014 |
| WO | 2011087162 A1 | 7/2011 |
| WO | 2013029482 A1 | 3/2013 |
| WO | 2013105811 A1 | 7/2013 |
| WO | 2014082266 A1 | 6/2014 |

OTHER PUBLICATIONS

XP050813460 3GPP TS 36.211 V12.1.0 (Mar. 2014),3rd Generation Partnership Project;Technical Specification Group Radio Access Network;Evolved Universal Terrestrial Radio Access (E-UTRA);Physical channels and modulation (Release 12),total 121 pages.
JP/2018-175865, Office Action dated Mar. 9, 2020.
U.S. Appl. No. 15/382,206, filed Dec. 16, 2016.

\* cited by examiner

SIGNAL TRANSMISSION METHOD AND APPARATUS

CROSS-REFERENCE TO RELATED APPLICATIONS

This application is a continuation of U.S. application Ser. No. 15/382,206, filed on Dec. 16, 2016, which is a continuation of International Application No. PCT/CN2015/081715, filed on Jun. 17, 2015, which claims priority to International Application PCT/CN2014/080028, filed on Jun. 17, 2014. All of the afore-mentioned patent applications are hereby incorporated by reference in their entireties.

TECHNICAL FIELD

Embodiments of the present invention relate to the communications field, and in particular, to a 3D-MIMO signal transmission technology.

BACKGROUND

A multiple-input multiple-output (Multiple Input Multiple Output, MIMO) technology has been widely applied in a wireless communications system to improve a system capacity and ensure cell coverage. For example, multi-antenna based transmit diversity, open-loop/closed-loop spatial multiplexing, and demodulation reference signal (Demodulation Reference Signal, DM-RS) based multi-stream transmission are used in downlink in a Long Term Evolution (Long Term Evolution, LTE) system. The DM-RS based multi-stream transmission is a main transmission mode used in an LTE Advanced (LTE-A) system and a follow-up system.

In a conventional MIMO system, a codeword-to-pilot-port mapping relationship of data is fixed when a quantity of transmission layers, that is, a rank is fixed. In this process, multiple mapping relationships exist, and are mainly a codeword-to-layer mapping (Codeword-to-layer mapping) and a layer-to-pilot-port mapping. A pilot port includes a channel state information-reference signal (CSI-RS) port and a demodulation reference signal (DM-RS) port. A mapping relationship between a layer and a corresponding CSI-RS port may be further classified into a mapping relationship between the layer and a corresponding demodulation reference signal (DM-RS) port and a mapping relationship between the corresponding DM-RS port and the corresponding CSI-RS port. When the quantity of transmission layers is fixed, the fixed mapping relationship causes a waste of resources and low transmission efficiency.

Each antenna port for transmitting a reference signal is mapped to four antenna elements or four radio frequency units. The antenna port for transmitting a reference signal refers to a logical port used for transmission. Different weighted values are used to weight different antenna elements or different transceiver radio units (T×RU, transceiver radio unit) to obtain beams in different directions. The weighted values are complex numbers. Weighting performed on an antenna element or a T×RU corresponding to an antenna port for transmitting a reference signal may be a mapping relationship. FIG. 8a shows a case in which two antenna ports for transmitting a reference signal are mapped to four antenna elements. In the present invention, a port 0 (802) and a port 4 (803) are mapped to four antenna elements in the first column (801) in a first antenna array; a port 1 (805) and a port 5 (806) are mapped to four antenna elements in the second column (804) in the first antenna array; a port 2 (808) and a port 6 (809) are mapped to four antenna elements in the third column (807) in the first antenna array; and a port 3 (811) and a port 7 (812) are mapped to four antenna elements in the fourth column (810) in the first antenna array. The port 0 to the port 7 are antenna ports for transmitting a reference signal. The four antenna elements in the first column in the first antenna array are used as an example. Beams formed by using the four antenna elements in the first column in the first antenna array are formed by mapping the port 0 and the port 4 to the four antenna elements and by means of transmission. This specific mapping manner may be in a form of weighting. Weighted values that may be used for the port 0 are w0, w1, w2, and w3, and weighted values used for the port 4 that is mapped to the same four antenna elements (or T×RUs) are w4, w5, w6, and w7, where w0, w1, w2, w3, w4, w5, w6, and w7 are complex numbers. Therefore, a direction of a beam, formed by performing weighting by using w0, w1, w2, and w3, of the port 0 is a first direction (813), and a direction of a beam, formed by performing weighting by using w4, w5, w6, and w7, of the port 4 is a second direction (814). Specific beam orientations of the first direction and the second direction may be determined according to a scenario. For example, the first direction may point upwards relative to a horizontal plane, and the second direction may point downwards relative to the horizontal plane; or the first direction and the second direction may point to determined directions separately.

FIG. 8b is a schematic diagram of mapping antenna ports for transmitting a reference signal to two antenna elements. A port 4 (824) is mapped to two antenna elements 841 and 842 in the first column in a first antenna array. A Port 0 (823) is mapped to the other two antenna elements in the first column in the first antenna array. A mapping relationship of another column is similar. For the port 4, the antenna elements 841 and 842 corresponding to the port 0 are weighted, and so on.

The weighting described above may be precoding weighting, that is, when precoding is being performed on a signal by using a precoding matrix, weighting is performed by using the precoding matrix, which is equivalent to weighting performed on the signal. Alternatively, the weighting may be performed on a driver network of a radio frequency by using a circuit. Generally, if slashes shown in the figure indicate antenna elements, the weighting may be driver network weighting; if the slashes indicate T×RU radio units, the weighting manner may be precoding weighting. The precoding weighting may be baseband weighting.

SUMMARY

In view of this, embodiments of the present invention provide a data transmission method, an apparatus, and a system, to implement high-efficient data transmission in 3D-MIMO. The technical solutions in the present invention may be applied to various wireless communications systems, for example, a Global System for Mobile Communications (Global System for Mobile communications, GSM for short), a general packet radio service (General Packet Radio Service, GPRS for short) system, a Code Division Multiple Access (Code Division Multiple Access, CDMA for short) system, a CDMA2000 system, a Wideband Code Division Multiple Access (Wideband Code Division Multiple Access, WCDMA for short) system, a Long Term Evolution (Long Term Evolution, LTE for short) system, or a Worldwide Interoperability for Microwave Access (Worldwide Interoperability for Microwave Access, WiMAX for short) system.

A network device in the present invention may be a base station. The base station may be a base station controller (Base Station Controller, BSC for short) in the GSM system, the GPRS system, or the CDMA system, or may be an evolved NodeB (Evolved NodeB, eNB for short) in the LTE system, or may be a network element such as an access service network base station (Access Service Network Base Station, ASN BS for short) in a WiMAX network. UE may be a device such as a mobile phone or a tablet computer. The eNB and the UE are used as an example for description in some embodiments of the present invention. However, types of the base station and a terminal apparatus are not limited.

According to a first aspect, the present invention provides a data transmission method, including: receiving a first reference signal sent by a network device; measuring the first reference signal to obtain a measurement result; determining at least one mapping relationship from a mapping relationship set according to the measurement result, where the mapping relationship set includes at least one of a first relationship set, a second relationship set, or a third relationship set, the first relationship set includes multiple mapping relationships between a codeword and transmission layers when a quantity of transmission layers is determined, the second relationship set includes multiple mapping relationships between the transmission layers and a demodulation reference signal DM-RS port, and the third relationship set includes multiple mapping relationships between the transmission layers and a channel state information-reference signal CSI-RS port; and sending a notification message to the network device, where the notification message is used to indicate the determined mapping relationship.

In a first possible implementation manner of the first aspect, the method further includes: sending a channel quality indicator CQI to the network device, where at least one of a quantity of the CQIs or a value of the CQI is obtained according to the determined at least one mapping relationship.

In a second possible implementation manner of the first aspect, when the quantity of transmission layers is greater than or equal to 2, the first relationship set includes at least a first mapping relationship and a second mapping relationship; in the first mapping relationship, a first codeword is mapped to a first transmission layer set, and a second codeword is mapped to a second transmission layer set; in the second mapping relationship, the first codeword is mapped to a third transmission layer set, and the second codeword is mapped to a fourth transmission layer set; where each transmission layer set includes at least one transmission layer, the first transmission layer set is different from the third transmission layer set, and the second transmission layer set is different from the fourth transmission layer set.

In a third possible implementation manner of the first aspect,
when the quantity of transmission layers is greater than or equal to 2, at least one first relationship in at least one mapping relationship in the first relationship set meets a first condition, where the first condition is: in mapping relationships between k codewords and respective layers, if the $i^{th}$ codeword and the $j^{th}$ codeword meet i>j, m<n is met, where each codeword is mapped to at least one layer, a layer with a minimum sequence number in the layer corresponding to the $j^{th}$ codeword is the $m^{th}$ layer, and a layer with a maximum sequence number in the layer corresponding to the $j^{th}$ codeword is the $n^{th}$ layer.

In a fourth possible implementation manner of the first aspect, the third relationship is a mapping relationship between the DM-RS port and the CSI-RS port.

In a fifth possible implementation manner of the first aspect, the first reference signal is a CSI-RS signal.

In a sixth possible implementation manner of the first aspect, the first reference signal includes at least two reference signals corresponding to different CSI-RS configuration information, and the reference signals corresponding to the different CSI-RS configuration information are corresponding to different ports.

In a seventh possible implementation manner of the first aspect, when the mapping relationship set includes the first relationship set, the performing measurement according to the first reference signal, and the determining one mapping relationship from a mapping relationship set according to the measurement result include: measuring the first reference signal to obtain a channel coefficient; calculating an equivalent channel coefficient of a channel according to the channel coefficient and a codebook; calculating a signal-to-noise ratio of each layer according to the equivalent channel coefficient of the channel; calculating a channel capacity of each codeword-to-layer mapping relationship in the first relationship set according to the signal-to-noise ratio of each layer; and determining a codeword-to-layer mapping relationship with a maximum channel capacity.

According to a second aspect, the present invention provides a data transmission method, including: sending, by a network device, a first reference signal to user equipment UE; receiving, by the network device, a notification message that is sent by the UE and that is generated according to the first reference signal, where the notification message is used to indicate at least one mapping relationship in a mapping relationship set; and obtaining, by the network device, the at least one mapping relationship from the mapping relationship set according to the mapping relationship message, where the at least one mapping relationship is determined by the UE from the mapping relationship set according to the first reference signal, the mapping relationship set includes at least one of a first relationship set, a second relationship set, or a third relationship set, the first relationship set includes multiple mapping relationships between a codeword and transmission layers when a quantity of transmission layers is determined, the second relationship set includes multiple mapping relationships between the transmission layers and a demodulation reference signal DM-RS port, and the third relationship set includes multiple mapping relationships between the transmission layers and a channel state information-reference signal CSI-RS port.

In a first possible implementation manner of the second aspect, the method further includes: receiving a channel quality indicator CQI sent by the UE, where at least one of a quantity of the CQIs or a value of the CQI is obtained according to the determined at least one mapping relationship.

In a second possible implementation manner of the second aspect, when the quantity of transmission layers is greater than or equal to 2, the first relationship set includes at least a first mapping relationship and a second mapping relationship; in the first mapping relationship, a first codeword is mapped to a first transmission layer set, and a second codeword is mapped to a second transmission layer set; in the second mapping relationship, the first codeword is mapped to a third transmission layer set, and the second codeword is mapped to a fourth transmission layer set; where each transmission layer set includes at least one transmission layer, the first transmission layer is different from the third transmission layer set, and the second transmission layer set is different from the fourth transmission layer set.

In a third possible implementation manner of the second aspect, when the quantity of transmission layers is greater than or equal to 2, at least one first relationship in at least one mapping relationship in the first relationship set meets a first condition, where the first condition is: in mapping relationships between k codewords and respective layers, if the $i^{th}$ codeword and the $i^{th}$ codeword meet i>j, m<n is met, where each codeword is mapped to at least one layer, a layer with a minimum sequence number in the layer corresponding to the $i^{th}$ codeword is the $m^{th}$ layer, and a layer with a maximum sequence number in the layer corresponding to the $i^{th}$ codeword is the $n^{th}$ layer.

In a fourth possible implementation manner of the second aspect, the third relationship is a mapping relationship between the DM-RS port and the CSI-RS port.

In a fifth possible implementation manner of the second aspect, the first reference signal is a CSI-RS signal.

In a sixth possible implementation manner of the second aspect, the first reference signal includes at least two reference signals corresponding to different CSI-RS configuration information, and the reference signals corresponding to the different CSI-RS configuration information are corresponding to different ports.

According to a third aspect, the present invention provides user equipment, including: a receiving unit, configured to receive a first reference signal sent by a network device; a measurement unit, configured to measure the first reference signal to obtain a measurement result; a first determining unit, configured to determine at least one mapping relationship from a mapping relationship set according to the measurement result, where the mapping relationship set includes at least one of a first relationship set, a second relationship set, or a third relationship set, the first relationship set includes multiple mapping relationships between a codeword and transmission layers when a quantity of transmission layers is determined, the second relationship set includes multiple mapping relationships between the transmission layers and a demodulation reference signal DM-RS port, and the third relationship set includes multiple mapping relationships between the transmission layers and a channel state information-reference signal CSI-RS port; and a first sending unit, configured to send a notification message to the network device, where the notification message is used to indicate the mapping relationship determined by the first determining unit.

In a first possible implementation manner of the third aspect, the user equipment further includes a second sending unit, configured to send a channel quality indicator CQI to the network device, where at least one of a quantity of the CQIs or a value of the CQI is obtained according to the determined at least one mapping relationship.

In a second possible implementation manner of the third aspect, when the quantity of transmission layers is greater than or equal to 2, the first relationship set includes at least a first mapping relationship and a second mapping relationship; in the first mapping relationship, a first codeword is mapped to a first transmission layer set, and a second codeword is mapped to a second transmission layer set; in the second mapping relationship, the first codeword is mapped to a third transmission layer set, and the second codeword is mapped to a fourth transmission layer set; where each transmission layer set includes at least one transmission layer, the first transmission layer set is different from the third transmission layer set, and the second transmission layer set is different from the fourth transmission layer set.

In a third possible implementation manner of the third aspect, when the quantity of transmission layers is greater than or equal to 2, at least one first relationship in at least one mapping relationship in the first relationship set meets a first condition, where the first condition is: in mapping relationships between k codewords and respective layers, if the $i^{th}$ codeword and the $i^{th}$ codeword meet i>j, m<n is met, where each codeword is mapped to at least one layer, a layer with a minimum sequence number in the layer corresponding to the $i^{th}$ codeword is the $m^{th}$ layer, and a layer with a maximum sequence number in the layer corresponding to the $i^{th}$ codeword is the $n^{th}$ layer.

In a fourth possible implementation manner of the third aspect, the third relationship is a mapping relationship between the DM-RS port and the CSI-RS port.

In a fifth possible implementation manner of the third aspect, the first reference signal is a CSI-RS signal.

In a sixth possible implementation manner of the third aspect, the first reference signal includes at least two reference signals corresponding to different CSI-RS configuration information, and the reference signals corresponding to the different CSI-RS configuration information are corresponding to different ports.

In a seventh possible implementation manner of the third aspect, the first determining unit includes: an obtaining unit, configured to obtain a channel coefficient according to the measurement result of the first reference signal; a first calculation unit, configured to calculate an equivalent channel coefficient of a channel according to the channel coefficient and a codebook; a second calculation unit, configured to calculate a signal-to-noise ratio of each layer according to the equivalent channel coefficient of the channel; a third calculation unit, configured to calculate a channel capacity of each codeword-to-layer mapping relationship in the first relationship set according to the signal-to-noise ratio of each layer; and a second determining unit, configured to determine a codeword-to-layer mapping relationship with a maximum channel capacity.

According to a fourth aspect, the present invention provides a network device, including: a sending unit, configured to send a first reference signal to user equipment UE; a first receiving unit, configured to receive a mapping relationship message that is sent by the UE and that is generated according to the first reference signal, where the notification message is used to indicate at least one mapping relationship in a mapping relationship set; and a determining unit, configured to obtain the at least one mapping relationship from the mapping relationship set according to the mapping relationship message, where the at least one mapping relationship is determined by the UE from the mapping relationship set according to the first reference signal, the mapping relationship set includes at least one of a first relationship set, a second relationship set, or a third relationship set, the first relationship set includes multiple mapping relationships between a codeword and transmission layers when a quantity of transmission layers is determined, the second relationship set includes multiple mapping relationships between the transmission layers and a demodulation reference signal DM-RS port, and the third relationship set includes multiple mapping relationships between the transmission layers and a channel state information-reference signal CSI-RS port.

In a first possible implementation manner of the fourth aspect, the network device further includes a second receiving unit, configured to receive a channel quality indicator CQI sent by the UE, where at least one of a quantity of the CQIs or a value of the CQI is obtained according to the determined at least one mapping relationship.

In a second possible implementation manner of the fourth aspect, when the quantity of transmission layers is greater than or equal to 2, the first relationship set includes at least a first mapping relationship and a second mapping relationship; in the first mapping relationship, a first codeword is mapped to a first transmission layer set, and a second codeword is mapped to a second transmission layer set; in the second mapping relationship, the first codeword is mapped to a third transmission layer set, and the second codeword is mapped to a fourth transmission layer set; where each transmission layer set includes at least one transmission layer, the first transmission layer is different from the third transmission layer set, and the second transmission layer set is different from the fourth transmission layer set.

In a third possible implementation manner of the fourth aspect, when the quantity of transmission layers is greater than or equal to 2, at least one first relationship in at least one mapping relationship in the first relationship set meets a first condition, where the first condition is: in mapping relationships between k codewords and respective layers, if the $i^{th}$ codeword and the $i^{th}$ codeword meet i>j, m<n is met, where each codeword is mapped to at least one layer, a layer with a minimum sequence number in the layer corresponding to the $i^{th}$ codeword is the $m^{th}$ layer, and a layer with a maximum sequence number in the layer corresponding to the $i^{th}$ codeword is the $n^{th}$ layer.

In a fourth possible implementation manner of the fourth aspect, the third relationship is a mapping relationship between the DM-RS port and the CSI-RS port.

In a fifth possible implementation manner of the fourth aspect, the first reference signal is a CSI-RS signal.

In a sixth possible implementation manner of the fourth aspect, the first reference signal includes at least two reference signals corresponding to different CSI-RS configuration information, and the reference signals corresponding to the different CSI-RS configuration information are corresponding to different ports.

According to the foregoing solutions, in the methods, apparatuses, and embodiments provided in the present invention, a codeword-to-port mapping relationship can be configured flexibly, thereby achieving purposes of improving channel quality and increasing a signal-to-noise ratio.

DESCRIPTION OF EMBODIMENTS

In the embodiments of the present invention, apparatus embodiments for implementing steps and methods in the foregoing method embodiments are further provided. It should be understood that the steps in the method and system embodiments of the present invention are merely an implementation solution, and the present invention sets no limitation to but requires protection of logical integration, splitting, and sequence adjustment to the steps of various solutions; the apparatuses, modules, units, and entities in the apparatus embodiments of the present invention are merely an implementation solution, and the present invention sets no limitation to but requires protection of splitting, combination, or another logical modification to various apparatuses, modules, units, and entities.

Figure 1:
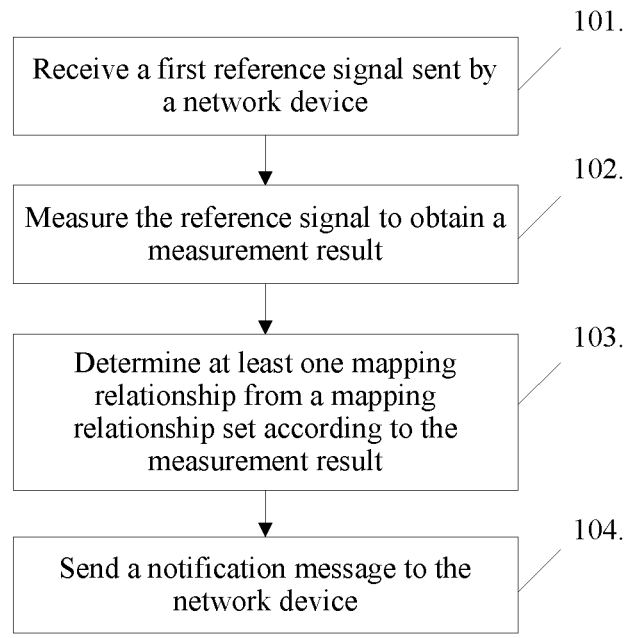
FIG. 1 is a flowchart of an embodiment of a data transmission method according to the present invention.

FIG. 1 shows an embodiment of a data transmission method in the present invention. The method is a method in which user equipment UE transmits data. The method may be applied to a network including the user equipment. The UE selects at least one mapping relationship set from at least one mapping relationship set, then selects a specific mapping relationship from the selected mapping relationship set, and transmits data according to the mapping relationship. Details are as follows:

Step 101: Receive a first reference signal sent by a network device. Optionally, the network device is an evolved NodeB eNB.

Step 102: Measure the first reference signal to obtain a measurement result.

Step 103: Determine at least one mapping relationship from a mapping relationship set according to the measurement result, where the mapping relationship set includes at least one of a first relationship set, a second relationship set, or a third relationship set, the first relationship set includes multiple mapping relationships between a codeword and transmission layers when a quantity of transmission layers is determined, the second relationship set includes multiple mapping relationships between the transmission layers and a demodulation reference signal DM-RS port, and the third relationship set includes multiple mapping relationships between the transmission layers and a channel state information-reference signal CSI-RS port. The DM-RS port may be a corresponding port for transmitting a demodulation reference signal DM-RS, and the CSI-RS port may be a corresponding port for transmitting a channel state information-reference signal CSI-RS.

It should be understood that the mapping relationship set may include respective mapping relationships in multiple sets of the first relationship set, the second relationship set, and the third relationship set. For example, the mapping relationship set may include a mapping relationship of mapping a codeword to a layer of the codeword in the first relationship set, and further includes a mapping relationship between a layer and a corresponding CSI-RS port in the third relationship set. The UE determines a mapping relationship between a codeword and a layer of the codeword from the first relationship set, and the UE further determines a mapping relationship between a layer and a corresponding CSI-RS port from the third relationship set. A determining sequence of the first relationship set, the second relationship set, and the third relationship set is not limited in the present invention. In addition, there are many manners for determining a mapping relationship from the mapping relationship set. In an embodiment of the present invention, when the mapping relationship set includes the first relationship set, step 102 and step 103 may be:

receiving the first reference signal sent by the network device; measuring the first reference signal to obtain a channel coefficient; calculating an equivalent channel coefficient of a channel according to the channel coefficient and a codebook; calculating a signal-to-noise ratio of each layer according to the equivalent channel coefficient of the channel; calculating a channel capacity of each codeword-to-layer mapping relationship in the first relationship set according to the signal-to-noise ratio of each layer; and determining a codeword-to-layer mapping relationship with a maximum channel capacity. Specifically, the first reference signal is a CSI-RS signal. The UE measures the CSI-RS to obtain a transmission matrix of the channel. Optionally, the first reference signal is a reference signal corresponding to configuration information of at least two CSI-RSs. The first reference signal corresponding to different CSI-RS configuration information is corresponding to different ports. For example, when a quantity of all configured CSI-RS ports is 8 and a quantity of transmission layers is 5, a first CSI-RS signal is corresponding to a port 0 to a port 3, and a second CSI-RS signal is corresponding to a port 4 to a port 7; and correspondingly, a CSI-RS of first configuration information is corresponding to the port 0 to the port 3, and a CSI-RS of second configuration information is corresponding to the port 4 to the port 7. A CSI-RS port index of the second configuration information may be numbered still from a port 0. For ease of distinguishing, the CSI-RS port index of the second configuration information is numbered from a port 4 herein.

In an embodiment, at least two reference signals included in the first reference signal that are corresponding to different CSI-RS configuration information are reference signals obtained by means of precoding weighting. Optionally, at least two reference signals included in the first reference signal that are corresponding to different CSI-RS configuration information are reference signals obtained by means of different precoding weighting.

In an embodiment, the CSI-RS configuration information includes a location of a time-frequency resource occupied by a CSI-RS. As shown in Table 1, different frame structures may be configured according to different CSI-RSs. Alternatively, the CSI-RS configuration information includes a CSI-RS subframe configuration, for example, a CSI-RS sending period and a time offset (offset) in Table 2.

TABLE 1

CSI-RS configuration in the case of a cyclic prefix

| | | CSI-RS configuration indication | | | | | |
|---|---|---|---|---|---|---|---|
| | CSI-RS | 1 or 2 | | 4 | | 8 | |
| | configuration | (k', l') | $n_s$ mod 2 | (k', l') | $n_s$ mod 2 | (k', l') | $n_s$ mod 2 |
| Frame structure 1 and frame structure 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Only a frame structure 2 exists | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

CSI-RS subframe configuration

| CSI-RS subframe configuration $I_{CSI-RS}$ | CSI-RS period $T_{CSI-RS}$ (unit: subframe) | CSI-RS subframe offset $\Delta_{CSI-RS}$ (unit: subframe) |
|---|---|---|
| 0-4 | 5 | $I_{CSI-RS}$ |
| 5-14 | 10 | $I_{CSI-RS}$ − 5 |

TABLE 2-continued

CSI-RS subframe configuration

| CSI-RS subframe configuration $I_{CSI-RS}$ | CSI-RS period $T_{CSI-RS}$ (unit: subframe) | CSI-RS subframe offset $\Delta_{CSI-RS}$ (unit: subframe) |
|---|---|---|
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

CSI-RS port sets of different configuration information have different precoding weighted values. That is, a quantity of CSI-RS ports of the first configuration information is 4: the port 0 to the port 3; a quantity of CSI-RS ports of the second configuration information is 4: port4~port7; and the port 0 to the port 3 and the port 4 to the port 7 have different precoding weighting.

In an embodiment, quantities of CSI-RS ports of different configuration information may be different.

Specifically, the UE measures a CSI-RS to obtain a channel matrix.

In an embodiment, the UE determines a quantity of layers and determines mapping relationships between the layers and different corresponding CSI-RS ports.

The UE obtains a channel matrix by measuring the first CSI-RS:

$$H_1 = \begin{bmatrix} h_{00} & h_{01} & \cdots & h_{03} \\ h_{10} & h_{11} & \cdots & h_{13} \\ \vdots & \vdots & \cdots & \vdots \\ h_{70} & h_{71} & \cdots & h_{73} \end{bmatrix}$$

The UE obtains a channel matrix by measuring the second CSI-RS:

$$H_2 = \begin{bmatrix} h_{04} & h_{05} & \cdots & h_{07} \\ h_{14} & h_{15} & \cdots & h_{17} \\ \vdots & \vdots & \cdots & \vdots \\ h_{74} & h_{75} & \cdots & h_{77} \end{bmatrix}$$

A finally combined channel matrix is:

$$H = \begin{bmatrix} h_{00} & h_{01} & \cdots & h_{07} \\ h_{10} & h_{11} & \cdots & h_{17} \\ \vdots & \vdots & \cdots & \vdots \\ h_{70} & h_{71} & \cdots & h_{77} \end{bmatrix}$$

If the determined codebook is $W_{8\times 5}$, the equivalent channel coefficient (a matrix) is $H_{eff} = H W_{8\times 5}$, and $$H_{eff} = \begin{bmatrix} h_{00}^{eff} & h_{01}^{eff} & \cdots & h_{04}^{eff} \\ h_{10}^{eff} & h_{11}^{eff} & \cdots & h_{14}^{eff} \\ \vdots & \vdots & \cdots & \vdots \\ h_{70}^{eff} & h_{71}^{eff} & \cdots & h_{74}^{eff} \end{bmatrix} = \begin{bmatrix} \hat{h}_{eff}(0) & \hat{h}_{eff}(1) & \hat{h}_{eff}(2) & \hat{h}_{eff}(3) & \hat{h}_{eff}(4) \end{bmatrix},$$

where $\hat{h}_{eff}(x)$ indicates an equivalent channel coefficient of the $x^{th}$ layer. It should be understood that, for convenience, a form of a matrix is used for description in the present invention. Various calculation processes or methods in the present invention may be implemented in other forms, which may be but are not limited to sequence calculation or array calculation.

A signal-to-noise ratio of a corresponding layer is calculated by using an equivalent channel coefficient $\hat{h}_{eff}(x)$ of the layer. Optionally, an MMSE algorithm may be used for the calculation.

The channel capacity of each codeword-to-layer mapping relationship in the first relationship set is calculated according to the signal-to-noise ratio of each layer. Optionally, a capacity formula may be used for the calculation. For example, a mapping relationship in the first relationship set is:

$x^{(3)}(i) = d^{(0)}(2i)$
$x^{(4)}(i) = d^{(0)}(2i+1)$
$x^{(0)}(i) = d^{(1)}(3i)$
$x^{(1)}(i) = d^{(1)}(3i+1)$
$x^{(2)}(i) = d^{(1)}(3i+2)$

A corresponding codeword 0 is mapped to the third and fourth layers, and a signal-to-noise ratio of the corresponding codeword 0 is SNR_CW(0). A corresponding codeword 1 is mapped to the $0^{th}$, first, and second layers, and a signal-to-noise ratio of the corresponding codeword 1 is SNR_CW(1). A total capacity C that is of the mapping relationships and that is obtained by using the capacity formula is:

C=10lg(1+SNR_CW(0))(1+SNR_CW(1))

According to the method, each codeword-to-layer mapping relationship in the first relationship set is calculated in a traversal manner, and the codeword-to-layer mapping relationship corresponding to the maximum capacity is selected.

It should be understood that determining the codeword-to-layer mapping relationship from the first relationship set is merely an example. In this process, different implementation manners may exist. For example, the mapping relationship is determined by measuring a throughput and by measuring a channel capacity and another parameter, or determined comprehensively by using multiple parameters. The present invention sets no limitation to but requires protection of all methods that meet selection of a mapping relationship from the first relationship set.

In an embodiment, when the quantity of transmission layers is greater than or equal to 2, the first relationship set includes at least a first mapping relationship and a second mapping relationship; in the first mapping relationship, a first codeword is mapped to a first transmission layer set, and a second codeword is mapped to a second transmission layer set; in the second mapping relationship, the first codeword is mapped to a third transmission layer set, and the second codeword is mapped to a fourth transmission layer set.

Each transmission layer set includes at least one transmission layer, the first transmission layer set is different from the third transmission layer set, and the second transmission layer set is different from the fourth transmission layer set. It should be understood that differences between the sets may mean that an element included in the first transmission layer set is different from an element included in the third transmission layer set, and an element included in the second transmission layer set is different from an element included in the fourth transmission layer set. If there is no explanation, differences between sets involved in the present invention may be understood as the foregoing concept, and are not described again.

In an embodiment, when the quantity of transmission layers is greater than or equal to 2, at least one first relationship in at least one mapping relationship in the first relationship set meets a first condition, where the first condition is:

in mapping relationships between k codewords and respective layers, if the $i^{th}$ codeword and the $i^{th}$ codeword meet i>j, m<n is met, where a layer with a minimum sequence number in the layer corresponding to the $i^{th}$ codeword is the $m^{th}$ layer, and a layer with a maximum sequence number in the layer corresponding to the $j^{th}$ codeword is the $n^{th}$ layer. For example, the following first relationship mapping exists:

$x^{(0)}(i)=d^{(0)}(3i)$
$x^{(2)}(i)=d^{(0)}(3i+1)$
$x^{(4)}(i)=d^{(0)}(3i+2)$
$x^{(1)}(i)=d^{(1)}(2i)$
$x^{(3)}(i)=d^{(1)}(2i+1)$ where $d^{(k)}(q)$ indicates the $q^{th}$ value of the $k^{th}$ codeword, $x^{(m)}(n)=d^{(k)}(q)$ indicates that the $q^{th}$ value of the $k^{th}$ codeword is mapped to the $m^{th}$ layer, and p is a quantity of layers.

A quantity of codewords is k=2, that is, there are two codewords: the 0th codeword and the first codeword 1. In this example, i=1, and j=0. The layer with the minimum sequence number in the layer corresponding to the $i^{th}$ codeword is the $m^{th}$ layer, that is, a minimum sequence number value m of a layer corresponding to the codeword 1 is 1; the layer with the maximum sequence number in the layer corresponding to the $i^{th}$ codeword is the $n^{th}$ layer, that is, a maximum sequence number value n of a layer corresponding to the codeword 0 is 4, where m<n is met.

$x^{(0)}(i)=d^{(0)}(3i)$
$x^{(2)}(l)=d^{(0)}(3i+l)$
$x^{(4)}(i)=d^{(0)}(di+2)$
$x^{(1)}(i)=i\ d^{(1)}(2i)$
$x^{(3)}(i)=d^{(1)}(2i+l)$,

In an embodiment, when the quantity of transmission layers is greater than or equal to 2, the first relationship set includes at least two first relationships. When a rank value (the quantity of transmission layers) is determined, the two first relationships are first relationships of mapping different quantities of codewords to a same quantity of transmission layers. For example, when the rank value is 5, the first relationship set may include a case in which one codeword is mapped to five layers and a case in which two codewords are mapped to five layers. Specifically, the following two first relationships are respectively corresponding to the case in which two codewords are mapped to five layers and the case in which one codeword is mapped to five layers:

$$x^{(0)}(i) = d^{(0)}(3i)$$
$$x^{(1)}(i) = d^{(0)}(3i+1)$$
$$x^{(2)}(i) = d^{(0)}(3i+2)$$
$$x^{(3)}(i) = d^{(1)}(2i)$$
$$x^{(4)}(i) = d^{(1)}(2i+1) \text{ and}$$
$$x^{(0)}(i) = d^{(0)}(5i)$$
$$x^{(1)}(i) = d^{(0)}(5i+1)$$
$$x^{(2)}(i) = d^{(0)}(5i+2)$$
$$x^{(3)}(i) = d^{(0)}(5i+3)$$
$$x^{(4)}(i) = d^{(0)}(5i+4)$$

In addition, the base station may notify, by using dynamic signaling or higher layer signaling, the UE of a first relationship in the first relationship set, or a second relationship in the second relationship set, or a third relationship in the third relationship set that is used during scheduling this time to demodulate data.

Next, the present invention provides a first relationship set embodiment, and some possible first relationship sets are provided in this embodiment. The first relationship set includes at least two of the following mapping relationships of mapping codewords to respective transmission layers, and in this embodiment, a rank indication value may be a RANK value:

$$x^{(1)}(i) = d^{(0)}(i)$$
$$x^{(0)}(i) = d^{(1)}(i),$$
$$x^{(0)}(i) = d^{(0)}(i)$$
$$x^{(1)}(i) = d^{(1)}(i), \text{ and}$$
$$x^{(0)}(i) = d^{(0)}(2i)$$
$$x^{(1)}(i) = d^{(0)}(2i+1),$$

where the rank indication value is 2, $d^{(k)}(q)$ indicates the $q^{th}$ value of the $k^{th}$ codeword, $x^{(p)}(n)=d^{(k)}(q)$ indicates that the $q^{th}$ value of the $k^{th}$ codeword is mapped to the $m^{th}$ layer, and p is a quantity of layers.

Alternatively, the first relationship set includes at least two of the following mapping relationships of mapping codewords to respective layers:

$$x^{(0)}(i) = d^{(0)}(i)$$
$$x^{(1)}(i) = d^{(1)}(2i)$$
$$x^{(2)}(i) = d^{(1)}(2i+1),$$
$$x^{(1)}(i) = d^{(0)}(i)$$
$$x^{(0)}(i) = d^{(1)}(2i)$$
$$x^{(2)}(i) = d^{(1)}(2i+1),$$
$$x^{(2)}(i) = d^{(0)}(i)$$
$$x^{(0)}(i) = d^{(1)}(2i)$$
$$x^{(1)}(i) = d^{(1)}(2i+1),$$
$$x^{(0)}(i) = d^{(0)}(2i)$$
$$x^{(1)}(i) = d^{(0)}(2i+1)$$
$$x^{(2)}(i) = d^{(1)}(i),$$
$$x^{(1)}(i) = d^{(0)}(2i)$$
$$x^{(0)}(i) = d^{(0)}(2i+1)$$
$$x^{(2)}(i) = d^{(1)}(i),$$
$$x^{(2)}(i) = d^{(0)}(2i)$$
$$x^{(0)}(i) = d^{(0)}(2i+1)$$
$$x^{(1)}(i) = d^{(1)}(i), \text{ and}$$
$$x^{(0)}(i) = d^{(0)}(3i)$$
$$x^{(1)}(i) = d^{(0)}(3i+1)$$
$$x^{(2)}(i) = d^{(0)}(3i+2),$$

where the rank indication value is 3, $d^{(k)}(q)$ (indicates the $q^{th}$ value of the $k^{th}$ codeword, $x^{(p)}(n)=d^{(k)}(q)$ indicates that the $q^{th}$ value of the $k^{th}$ codeword is mapped to the $m^{th}$ layer, and p is a quantity of layers.

The first relationship set includes at least two of the following mapping relationships of mapping codewords to respective layers:

$$x^{(0)}(i) = d^{(0)}(2i)$$
$$x^{(1)}(i) = d^{(0)}(2i+1)$$
$$x^{(2)}(i) = d^{(1)}(2i)$$
$$x^{(3)}(i) = d^{(1)}(2i+1),$$
$$x^{(0)}(i) = d^{(0)}(2i)$$
$$x^{(2)}(i) = d^{(0)}(2i+1)$$
$$x^{(1)}(i) = d^{(1)}(2i)$$
$$x^{(3)}(i) = d^{(1)}(2i+1),$$
$$x^{(0)}(i) = d^{(0)}(2i)$$
$$x^{(3)}(i) = d^{(0)}(2i+1)$$
$$x^{(1)}(i) = d^{(1)}(2i)$$
$$x^{(2)}(i) = d^{(1)}(2i+1),$$
$$x^{(1)}(i) = d^{(0)}(2i)$$
$$x^{(2)}(i) = d^{(0)}(2i+1)$$
$$x^{(0)}(i) = d^{(1)}(2i)$$
$$x^{(3)}(i) = d^{(1)}(2i+1),$$
$$x^{(1)}(i) = d^{(0)}(2i)$$
$$x^{(3)}(i) = d^{(0)}(2i+1)$$
$$x^{(0)}(i) = d^{(1)}(2i)$$
$$x^{(2)}(i) = d^{(1)}(2i+1),$$
$$x^{(2)}(i) = d^{(0)}(2i)$$
$$x^{(3)}(i) = d^{(0)}(2i+1)$$
$$x^{(0)}(i) = d^{(1)}(2i)$$
$$x^{(1)}(i) = d^{(1)}(2i+1), \quad \text{and}$$
$$x^{(0)}(i) = d^{(0)}(4i)$$
$$x^{(1)}(i) = d^{(0)}(4i+1)$$
$$x^{(2)}(i) = d^{(0)}(4i+2)$$
$$x^{(3)}(i) = d^{(0)}(4i+3),$$

where the rank indication value is 4, $d^{(k)}(q)$ (indicates the $q^{th}$ value of the $k^{th}$ codeword, $x^{(p)}(n)=d^{(k)}(q)$ indicates that the $q^{th}$ value of the $k^{th}$ codeword is mapped to the $m^{th}$ layer, and p is a quantity of layers. Alternatively, the first relationship set includes at least two of the following mapping relationships of mapping codewords to respective layers:

$$x^{(0)}(i) = d^{(0)}(3i)$$
$$x^{(1)}(i) = d^{(0)}(3i+1)$$
$$x^{(2)}(i) = d^{(0)}(3i+2)$$
$$x^{(3)}(i) = d^{(1)}(2i)$$

-continued $$x^{(4)}(i) = d^{(1)}(2i+1),$$
$$x^{(0)}(i) = d^{(0)}(3i)$$
$$x^{(1)}(i) = d^{(0)}(3i+1)$$
$$x^{(3)}(i) = d^{(0)}(3i+2)$$
$$x^{(2)}(i) = d^{(1)}(2i)$$
$$x^{(4)}(i) = d^{(1)}(2i+1),$$
$$x^{(0)}(i) = d^{(0)}(3i)$$
$$x^{(1)}(i) = d^{(0)}(3i+1)$$
$$x^{(4)}(i) = d^{(0)}(3i+2)$$
$$x^{(2)}(i) = d^{(1)}(2i)$$
$$x^{(3)}(i) = d^{(1)}(2i+1),$$
$$x^{(0)}(i) = d^{(0)}(3i)$$
$$x^{(2)}(i) = d^{(0)}(3i+1)$$
$$x^{(3)}(i) = d^{(0)}(3i+2)$$
$$x^{(1)}(i) = d^{(1)}(2i)$$
$$x^{(4)}(i) = d^{(1)}(2i+1),$$
$$x^{(0)}(i) = d^{(0)}(3i)$$
$$x^{(2)}(i) = d^{(0)}(3i+1)$$
$$x^{(4)}(i) = d^{(0)}(3i+2)$$
$$x^{(1)}(i) = d^{(1)}(2i)$$
$$x^{(3)}(i) = d^{(1)}(2i+1),$$
$$x^{(0)}(i) = d^{(0)}(3i)$$
$$x^{(3)}(i) = d^{(0)}(3i+1)$$
$$x^{(4)}(i) = d^{(0)}(3i+2)$$
$$x^{(1)}(i) = d^{(1)}(2i)$$
$$x^{(2)}(i) = d^{(1)}(2i+1),$$
$$x^{(1)}(i) = d^{(0)}(3i)$$
$$x^{(2)}(i) = d^{(0)}(3i+1)$$
$$x^{(3)}(i) = d^{(0)}(3i+2)$$
$$x^{(0)}(i) = d^{(1)}(2i)$$
$$x^{(4)}(i) = d^{(1)}(2i+1),$$
$$x^{(1)}(i) = d^{(0)}(3i)$$
$$x^{(2)}(i) = d^{(0)}(3i+1)$$
$$x^{(4)}(i) = d^{(0)}(3i+2)$$
$$x^{(0)}(i) = d^{(1)}(2i)$$
$$x^{(3)}(i) = d^{(1)}(2i+1),$$
$$x^{(1)}(i) = d^{(0)}(3i)$$
$$x^{(3)}(i) = d^{(0)}(3i+1)$$
$$x^{(4)}(i) = d^{(0)}(3i+2)$$
$$x^{(0)}(i) = d^{(1)}(2i)$$
$$x^{(2)}(i) = d^{(1)}(2i+1),$$
$$x^{(2)}(i) = d^{(0)}(3i)$$
$$x^{(3)}(i) = d^{(0)}(3i+1)$$
$$x^{(4)}(i) = d^{(0)}(3i+2)$$

-continued $x^{(0)}(i) = d^{(1)}(2i)$ $x^{(1)}(i) = d^{(1)}(2i+1)$, $x^{(0)}(i) = d^{(0)}(2i)$ $x^{(1)}(i) = d^{(0)}(2i+1)$ $x^{(2)}(i) = d^{(1)}(3i)$ $x^{(3)}(i) = d^{(1)}(3i+1)$ $x^{(4)}(i) = d^{(1)}(3i+2)$, $x^{(0)}(i) = d^{(0)}(2i)$ $x^{(2)}(i) = d^{(0)}(2i+1)$ $x^{(1)}(i) = d^{(1)}(3i)$ $x^{(3)}(i) = d^{(1)}(3i+1)$ $x^{(4)}(i) = d^{(1)}(3i+2)$, $x^{(0)}(i) = d^{(0)}(2i)$ $x^{(3)}(i) = d^{(0)}(2i+1)$ $x^{(1)}(i) = d^{(1)}(3i)$ $x^{(2)}(i) = d^{(1)}(3i+1)$ $x^{(4)}(i) = d^{(1)}(3i+2)$, $x^{(0)}(i) = d^{(0)}(2i)$ $x^{(4)}(i) = d^{(0)}(2i+1)$ $x^{(1)}(i) = d^{(1)}(3i)$ $x^{(2)}(i) = d^{(1)}(3i+1)$ $x^{(3)}(i) = d^{(1)}(3i+2)$, $x^{(1)}(i) = d^{(0)}(2i)$ $x^{(2)}(i) = d^{(0)}(2i+1)$ $x^{(0)}(i) = d^{(1)}(3i)$ $x^{(3)}(i) = d^{(1)}(3i+1)$ $x^{(4)}(i) = d^{(1)}(3i+2)$, $x^{(1)}(i) = d^{(0)}(2i)$ $x^{(3)}(i) = d^{(0)}(2i+1)$ $x^{(0)}(i) = d^{(1)}(3i)$ $x^{(2)}(i) = d^{(1)}(3i+1)$ $x^{(4)}(i) = d^{(1)}(3i+2)$, $x^{(1)}(i) = d^{(0)}(2i)$ $x^{(4)}(i) = d^{(0)}(2i+1)$ $x^{(0)}(i) = d^{(1)}(3i)$ $x^{(2)}(i) = d^{(1)}(3i+1)$ $x^{(3)}(i) = d^{(1)}(3i+2)$, $x^{(2)}(i) = d^{(0)}(2i)$ $x^{(3)}(i) = d^{(0)}(2i+1)$ $x^{(0)}(i) = d^{(1)}(3i)$ $x^{(1)}(i) = d^{(1)}(3i+1)$ $x^{(4)}(i) = d^{(1)}(3i+2)$, $x^{(2)}(i) = d^{(0)}(2i)$ $x^{(4)}(i) = d^{(0)}(2i+1)$ -continued $x^{(0)}(i) = d^{(1)}(3i)$ $x^{(1)}(i) = d^{(1)}(3i+1)$ $x^{(3)}(i) = d^{(1)}(3i+2)$, $x^{(3)}(i) = d^{(0)}(2i)$ $x^{(4)}(i) = d^{(0)}(2i+1)$ $x^{(0)}(i) = d^{(1)}(3i)$ $x^{(1)}(i) = d^{(1)}(3i+1)$ $x^{(2)}(i) = d^{(1)}(3i+2)$, and $x^{(0)}(i) = d^{(0)}(5i)$ $x^{(1)}(i) = d^{(0)}(5i+1)$ $x^{(2)}(i) = d^{(0)}(5i+2)$ $x^{(3)}(i) = d^{(0)}(5i+3)$ $x^{(4)}(i) = d^{(0)}(5i+4)$, where the rank indication value is 5, $d^{(k)}(q)$ indicates the $q^{th}$ value of the $k^{th}$ codeword, $x^{(p)}(n)=d^{(k)}(q)$ indicates that the $q^{th}$ value of the $k^{th}$ codeword is mapped to the $m^{th}$ layer, and p is a quantity of layers. Alternatively, the first relationship set includes at least two of the following mapping relationships of mapping codewords to respective layers:

$x^{(0)}(i) = d^{(0)}(3i)$
$x^{(1)}(i) = d^{(0)}(3i+1)$
$x^{(2)}(i) = d^{(0)}(3i+2)$
$x^{(3)}(i) = d^{(1)}(3i)$
$x^{(4)}(i) = d^{(1)}(3i+1)$
$x^{(5)}(i) = d^{(1)}(3i+2)$,
$x^{(0)}(i) = d^{(0)}(3i)$
$x^{(1)}(i) = d^{(0)}(3i+1)$
$x^{(2)}(i) = d^{(0)}(3i+2)$
$x^{(3)}(i) = d^{(1)}(3i)$
$x^{(4)}(i) = d^{(1)}(3i+1)$
$x^{(5)}(i) = d^{(1)}(3i+2)$,
$x^{(0)}(i) = d^{(0)}(3i)$
$x^{(1)}(i) = d^{(0)}(3i+1)$
$x^{(4)}(i) = d^{(0)}(3i+2)$
$x^{(2)}(i) = d^{(1)}(3i)$
$x^{(3)}(i) = d^{(1)}(3i+1)$
$x^{(5)}(i) = d^{(1)}(3i+2)$,
$x^{(0)}(i) = d^{(0)}(3i)$
$x^{(1)}(i) = d^{(0)}(3i+1)$
$x^{(5)}(i) = d^{(0)}(3i+2)$
$x^{(2)}(i) = d^{(1)}(3i)$
$x^{(3)}(i) = d^{(1)}(3i+1)$
$x^{(4)}(i) = d^{(1)}(3i+2)$,

-continued $x^{(0)}(i) = d^{(0)}(3i)$
$x^{(2)}(i) = d^{(0)}(3i+1)$
$x^{(3)}(i) = d^{(0)}(3i+2)$
$x^{(1)}(i) = d^{(1)}(3i)$
$x^{(4)}(i) = d^{(1)}(3i+1)$
$x^{(5)}(i) = d^{(1)}(3i+2)$,
$x^{(0)}(i) = d^{(0)}(3i)$
$x^{(2)}(i) = d^{(0)}(3i+1)$
$x^{(4)}(i) = d^{(0)}(3i+2)$
$x^{(1)}(i) = d^{(1)}(3i)$
$x^{(3)}(i) = d^{(1)}(3i+1)$
$x^{(5)}(i) = d^{(1)}(3i+2)$,
$x^{(0)}(i) = d^{(0)}(3i)$
$x^{(2)}(i) = d^{(0)}(3i+1)$
$x^{(5)}(i) = d^{(0)}(3i+2)$
$x^{(1)}(i) = d^{(1)}(3i)$
$x^{(3)}(i) = d^{(1)}(3i+1)$
$x^{(4)}(i) = d^{(1)}(3i+2)$,
$x^{(0)}(i) = d^{(0)}(3i)$
$x^{(3)}(i) = d^{(0)}(3i+1)$
$x^{(4)}(i) = d^{(0)}(3i+2)$
$x^{(1)}(i) = d^{(1)}(3i)$
$x^{(2)}(i) = d^{(1)}(3i+1)$
$x^{(5)}(i) = d^{(1)}(3i+2)$, $x^{(0)}(i) = d^{(0)}(3i)$
$x^{(3)}(i) = d^{(0)}(3i+1)$
$x^{(5)}(i) = d^{(0)}(3i+2)$
$x^{(1)}(i) = d^{(1)}(3i)$
$x^{(2)}(i) = d^{(1)}(3i+1)$
$x^{(4)}(i) = d^{(1)}(3i+2)$,
$x^{(0)}(i) = d^{(0)}(3i)$
$x^{(4)}(i) = d^{(0)}(3i+1)$
$x^{(5)}(i) = d^{(0)}(3i+2)$
$x^{(1)}(i) = d^{(1)}(3i)$
$x^{(2)}(i) = d^{(1)}(3i+1)$
$x^{(3)}(i) = d^{(1)}(3i+2)$,
$x^{(1)}(i) = d^{(0)}(3i)$
$x^{(2)}(i) = d^{(0)}(3i+1)$
$x^{(3)}(i) = d^{(0)}(3i+2)$
$x^{(0)}(i) = d^{(1)}(3i)$
$x^{(4)}(i) = d^{(1)}(3i+1)$
$x^{(5)}(i) = d^{(1)}(3i+2)$,
$x^{(1)}(i) = d^{(0)}(3i)$
$x^{(2)}(i) = d^{(0)}(3i+1)$
$x^{(4)}(i) = d^{(0)}(3i+2)$
$x^{(0)}(i) = d^{(1)}(3i)$
$x^{(3)}(i) = d^{(1)}(3i+1)$
$x^{(5)}(i) = d^{(1)}(3i+2)$,
$x^{(1)}(i) = d^{(0)}(3i)$
$x^{(2)}(i) = d^{(0)}(3i+1)$
$x^{(5)}(i) = d^{(0)}(3i+2)$
$x^{(0)}(i) = d^{(1)}(3i)$
$x^{(3)}(i) = d^{(1)}(3i+1)$
$x^{(4)}(i) = d^{(1)}(3i+2)$,
$x^{(1)}(i) = d^{(0)}(3i)$
$x^{(3)}(i) = d^{(0)}(3i+1)$
$x^{(4)}(i) = d^{(0)}(3i+2)$
$x^{(0)}(i) = d^{(1)}(3i)$
$x^{(2)}(i) = d^{(1)}(3i+1)$
$x^{(5)}(i) = d^{(1)}(3i+2)$,
$x^{(1)}(i) = d^{(0)}(3i)$
$x^{(3)}(i) = d^{(0)}(3i+1)$
$x^{(5)}(i) = d^{(0)}(3i+2)$
$x^{(0)}(i) = d^{(1)}(3i)$
$x^{(2)}(i) = d^{(1)}(3i+1)$
$x^{(4)}(i) = d^{(1)}(3i+2)$,
$x^{(1)}(i) = d^{(0)}(3i)$
$x^{(4)}(i) = d^{(0)}(3i+1)$
$x^{(5)}(i) = d^{(0)}(3i+2)$
$x^{(0)}(i) = d^{(1)}(3i)$
$x^{(2)}(i) = d^{(1)}(3i+1)$
$x^{(3)}(i) = d^{(1)}(3i+2)$, $x^{(2)}(i) = d^{(0)}(3i)$
$x^{(3)}(i) = d^{(0)}(3i+1)$
$x^{(4)}(i) = d^{(0)}(3i+2)$
$x^{(0)}(i) = d^{(1)}(3i)$
$x^{(1)}(i) = d^{(1)}(3i+1)$
$x^{(5)}(i) = d^{(1)}(3i+2)$,
$x^{(2)}(i) = d^{(0)}(3i)$
$x^{(3)}(i) = d^{(0)}(3i+1)$
$x^{(5)}(i) = d^{(0)}(3i+2)$
$x^{(0)}(i) = d^{(1)}(3i)$
$x^{(1)}(i) = d^{(1)}(3i+1)$
$x^{(4)}(i) = d^{(1)}(3i+2)$,
$x^{(2)}(i) = d^{(0)}(3i)$
$x^{(4)}(i) = d^{(0)}(3i+1)$
$x^{(5)}(i) = d^{(0)}(3i+2)$
$x^{(0)}(i) = d^{(1)}(3i)$
$x^{(1)}(i) = d^{(1)}(3i+1)$
$x^{(3)}(i) = d^{(1)}(3i+2)$,
$x^{(3)}(i) = d^{(0)}(3i)$
$x^{(4)}(i) = d^{(0)}(3i+1)$
$x^{(5)}(i) = d^{(0)}(3i+2)$
$x^{(0)}(i) = d^{(1)}(3i)$
$x^{(1)}(i) = d^{(1)}(3i+1)$
$x^{(2)}(i) = d^{(1)}(3i+2)$,
and
$x^{(0)}(i) = d^{(0)}(6i)$
$x^{(1)}(i) = d^{(0)}(6i+1)$
$x^{(2)}(i) = d^{(0)}(6i+2)$
$x^{(3)}(i) = d^{(0)}(6i+3)$
$x^{(4)}(i) = d^{(0)}(6i+4)$
$x^{(5)}(i) = d^{(0)}(6i+5)$, where the rank indication value is 6, $d^{(k)}(q)$ indicates the $q^{th}$ value of the $k^{th}$ codeword, $x^{(p)}(n)=d^{(k)}(q)$ indicates that the $q^{th}$ value of the $k^{th}$ codeword is mapped to the $m^{th}$ layer, and p is a quantity of layers. Alternatively, the first relationship set includes at least two of the following mapping relationships of mapping codewords to respective layers:

$x^{(0)}(i) = d^{(0)}(3i)$ $x^{(1)}(i) = d^{(0)}(3i+1)$ $x^{(2)}(i) = d^{(0)}(3i+1)$ $x^{(3)}(i) = d^{(1)}(4i)$ $x^{(4)}(i) = d^{(1)}(4i+1)$ $x^{(5)}(i) = d^{(1)}(4i+2)$ $x^{(6)}(i) = d^{(1)}(4i+3),$ $x^{(0)}(i) = d^{(0)}(3i)$ $x^{(1)}(i) = d^{(0)}(3i+1)$ $x^{(3)}(i) = d^{(0)}(3i+1)$ $x^{(2)}(i) = d^{(1)}(4i)$ $x^{(4)}(i) = d^{(1)}(4i+1)$ $x^{(5)}(i) = d^{(1)}(4i+2)$ $x^{(6)}(i) = d^{(1)}(4i+3),$ $x^{(0)}(i) = d^{(0)}(3i)$ $x^{(1)}(i) = d^{(0)}(3i+1)$ $x^{(4)}(i) = d^{(0)}(3i+1)$ $x^{(2)}(i) = d^{(1)}(4i)$ $x^{(3)}(i) = d^{(1)}(4i+1)$ $x^{(5)}(i) = d^{(1)}(4i+2)$ $x^{(6)}(i) = d^{(1)}(4i+3),$ $x^{(0)}(i) = d^{(0)}(3i)$ $x^{(1)}(i) = d^{(0)}(3i+1)$ $x^{(5)}(i) = d^{(0)}(3i+2)$ $x^{(2)}(i) = d^{(1)}(4i)$ $x^{(3)}(i) = d^{(1)}(4i+1)$ $x^{(4)}(i) = d^{(1)}(4i+2)$ $x^{(6)}(i) = d^{(1)}(4i+3),$ $x^{(0)}(i) = d^{(0)}(3i)$ $x^{(1)}(i) = d^{(0)}(3i+1)$ $x^{(6)}(i) = d^{(0)}(3i+2)$ $x^{(2)}(i) = d^{(1)}(4i)$ $x^{(3)}(i) = d^{(1)}(4i+1)$ $x^{(4)}(i) = d^{(1)}(4i+2)$ $x^{(5)}(i) = d^{(1)}(4i+3),$ $x^{(0)}(i) = d^{(0)}(3i)$ $x^{(2)}(i) = d^{(0)}(3i+1)$ $x^{(3)}(i) = d^{(0)}(3i+2)$ $x^{(1)}(i) = d^{(1)}(4i)$ $x^{(4)}(i) = d^{(1)}(4i+1)$ $x^{(5)}(i) = d^{(1)}(4i+2)$

-continued $x^{(6)}(i) = d^{(1)}(4i+3),$ $x^{(0)}(i) = d^{(0)}(3i)$ $x^{(2)}(i) = d^{(0)}(3i+1)$ $x^{(4)}(i) = d^{(0)}(3i+2)$ $x^{(1)}(i) = d^{(1)}(4i)$ $x^{(2)}(i) = d^{(1)}(4i+1)$ $x^{(5)}(i) = d^{(1)}(4i+2)$ $x^{(6)}(i) = d^{(1)}(4i+3),$ $x^{(0)}(i) = d^{(0)}(3i)$ $x^{(2)}(i) = d^{(0)}(3i+1)$ $x^{(5)}(i) = d^{(0)}(3i+2)$ $x^{(1)}(i) = d^{(1)}(4i)$ $x^{(3)}(i) = d^{(1)}(4i+1)$ $x^{(4)}(i) = d^{(1)}(4i+2)$ $x^{(6)}(i) = d^{(1)}(4i+3),$ $x^{(0)}(i) = d^{(0)}(3i)$ $x^{(2)}(i) = d^{(0)}(3i+1)$ $x^{(6)}(i) = d^{(0)}(3i+2)$ $x^{(1)}(i) = d^{(1)}(4i)$ $x^{(3)}(i) = d^{(1)}(4i+1)$ $x^{(4)}(i) = d^{(1)}(4i+2)$ $x^{(5)}(i) = d^{(1)}(4i+3),$ $x^{(0)}(i) = d^{(0)}(3i)$ $x^{(3)}(i) = d^{(0)}(3i+1)$ $x^{(4)}(i) = d^{(0)}(3i+2)$ $x^{(1)}(i) = d^{(1)}(4i)$ $x^{(2)}(i) = d^{(1)}(4i+1)$ $x^{(5)}(i) = d^{(1)}(4i+2)$ $x^{(6)}(i) = d^{(1)}(4i+3),$ $x^{(0)}(i) = d^{(0)}(3i)$ $x^{(3)}(i) = d^{(0)}(3i+1)$ $x^{(5)}(i) = d^{(0)}(3i+2)$ $x^{(1)}(i) = d^{(1)}(4i)$ $x^{(2)}(i) = d^{(1)}(4i+1)$ $x^{(4)}(i) = d^{(1)}(4i+2)$ $x^{(6)}(i) = d^{(1)}(4i+3),$ $x^{(0)}(i) = d^{(0)}(3i)$ $x^{(3)}(i) = d^{(0)}(3i+1)$ $x^{(6)}(i) = d^{(0)}(3i+2)$ $x^{(1)}(i) = d^{(1)}(4i)$ $x^{(2)}(i) = d^{(1)}(4i+1)$ $x^{(4)}(i) = d^{(1)}(4i+2)$ $x^{(5)}(i) = d^{(1)}(4i+3),$ $x^{(0)}(i) = d^{(0)}(3i)$ -continued $x^{(4)}(i) = d^{(0)}(3i+1)$ $x^{(5)}(i) = d^{(0)}(3i+2)$ $x^{(1)}(i) = d^{(1)}(4i)$ $x^{(2)}(i) = d^{(1)}(4i+1)$ $x^{(3)}(i) = d^{(1)}(4i+2)$ $x^{(6)}(i) = d^{(1)}(4i+3),$ $x^{(0)}(i) = d^{(0)}(3i)$ $x^{(4)}(i) = d^{(0)}(3i+1)$ $x^{(6)}(i) = d^{(0)}(3i+2)$ $x^{(1)}(i) = d^{(1)}(4i)$ $x^{(2)}(i) = d^{(1)}(4i+1)$ $x^{(3)}(i) = d^{(1)}(4i+2)$ $x^{(5)}(i) = d^{(1)}(4i+3),$ $x^{(0)}(i) = d^{(0)}(3i)$ $x^{(5)}(i) = d^{(0)}(3i+1)$ $x^{(6)}(i) = d^{(0)}(3i+2)$ $x^{(1)}(i) = d^{(1)}(4i)$ $x^{(2)}(i) = d^{(1)}(4i+1)$ $x^{(3)}(i) = d^{(1)}(4i+2)$ $x^{(4)}(i) = d^{(1)}(4i+3),$ $x^{(1)}(i) = d^{(0)}(3i)$ $x^{(2)}(i) = d^{(0)}(3i+1)$ $x^{(3)}(i) = d^{(0)}(3i+2)$ $x^{(0)}(i) = d^{(1)}(4i)$ $x^{(4)}(i) = d^{(1)}(4i+1)$ $x^{(5)}(i) = d^{(1)}(4i+2)$ $x^{(6)}(i) = d^{(1)}(4i+3),$ $x^{(1)}(i) = d^{(0)}(3i)$ $x^{(2)}(i) = d^{(0)}(3i+1)$ $x^{(4)}(i) = d^{(0)}(3i+2)$ $x^{(0)}(i) = d^{(1)}(4i)$ $x^{(2)}(i) = d^{(1)}(4i+1)$ $x^{(5)}(i) = d^{(1)}(4i+2)$ $x^{(6)}(i) = d^{(1)}(4i+3),$ $x^{(1)}(i) = d^{(0)}(3i)$ $x^{(2)}(i) = d^{(0)}(3i+1)$ $x^{(5)}(i) = d^{(0)}(3i+2)$ $x^{(0)}(i) = d^{(1)}(4i)$ $x^{(3)}(i) = d^{(1)}(4i+1)$ $x^{(4)}(i) = d^{(1)}(4i+2)$ $x^{(6)}(i) = d^{(1)}(4i+3),$ $x^{(1)}(i) = d^{(0)}(3i)$ $x^{(2)}(i) = d^{(0)}(3i+1)$ $x^{(6)}(i) = d^{(0)}(3i+2)$ -continued $x^{(0)}(i) = d^{(1)}(4i)$ $x^{(3)}(i) = d^{(1)}(4i+1)$ $x^{(4)}(i) = d^{(1)}(4i+2)$ $x^{(5)}(i) = d^{(1)}(4i+3),$ $x^{(1)}(i) = d^{(0)}(3i)$ $x^{(3)}(i) = d^{(0)}(3i+1)$ $x^{(4)}(i) = d^{(0)}(3i+2)$ $x^{(0)}(i) = d^{(1)}(4i)$ $x^{(2)}(i) = d^{(1)}(4i+1)$ $x^{(5)}(i) = d^{(1)}(4i+2)$ $x^{(6)}(i) = d^{(1)}(4i+3),$ $x^{(1)}(i) = d^{(0)}(3i)$ $x^{(3)}(i) = d^{(0)}(3i+1)$ $x^{(5)}(i) = d^{(0)}(3i+2)$ $x^{(0)}(i) = d^{(1)}(4i)$ $x^{(2)}(i) = d^{(1)}(4i+1)$ $x^{(4)}(i) = d^{(1)}(4i+2)$ $x^{(6)}(i) = d^{(1)}(4i+3),$ $x^{(1)}(i) = d^{(0)}(3i)$ $x^{(3)}(i) = d^{(0)}(3i+1)$ $x^{(6)}(i) = d^{(0)}(3i+2)$ $x^{(0)}(i) = d^{(1)}(4i)$ $x^{(2)}(i) = d^{(1)}(4i+1)$ $x^{(4)}(i) = d^{(1)}(4i+2)$ $x^{(5)}(i) = d^{(1)}(4i+3),$ $x^{(1)}(i) = d^{(0)}(3i)$ $x^{(4)}(i) = d^{(0)}(3i+1)$ $x^{(5)}(i) = d^{(0)}(3i+2)$ $x^{(0)}(i) = d^{(1)}(4i)$ $x^{(2)}(i) = d^{(1)}(4i+1)$ $x^{(3)}(i) = d^{(1)}(4i+2)$ $x^{(6)}(i) = d^{(1)}(4i+3),$ $x^{(1)}(i) = d^{(0)}(3i)$ $x^{(4)}(i) = d^{(0)}(3i+1)$ $x^{(6)}(i) = d^{(0)}(3i+2)$ $x^{(0)}(i) = d^{(1)}(4i)$ $x^{(2)}(i) = d^{(1)}(4i+1)$ $x^{(3)}(i) = d^{(1)}(4i+2)$ $x^{(5)}(i) = d^{(1)}(4i+3),$ $x^{(1)}(i) = d^{(0)}(3i)$ $x^{(5)}(i) = d^{(0)}(3i+1)$ $x^{(6)}(i) = d^{(0)}(3i+2)$ $x^{(0)}(i) = d^{(1)}(4i)$ $x^{(2)}(i) = d^{(1)}(4i+1)$ $x^{(3)}(i) = d^{(1)}(4i+2)$ $x^{(4)}(i) = d^{(1)}(4i+3),$ $x^{(2)}(i) = d^{(0)}(3i)$ $x^{(3)}(i) = d^{(0)}(3i+1)$ $x^{(4)}(i) = d^{(0)}(3i+2)$ $x^{(0)}(i) = d^{(1)}(4i)$ $x^{(1)}(i) = d^{(1)}(4i+1)$ $x^{(5)}(i) = d^{(1)}(4i+2)$ $x^{(6)}(i) = d^{(1)}(4i+3),$ $x^{(2)}(i) = d^{(0)}(3i)$ $x^{(3)}(i) = d^{(0)}(3i+1)$ $x^{(5)}(i) = d^{(0)}(3i+2)$ $x^{(1)}(i) = d^{(1)}(4i)$ $x^{(2)}(i) = d^{(1)}(4i+1)$ $x^{(4)}(i) = d^{(1)}(4i+2)$ $x^{(6)}(i) = d^{(1)}(4i+3),$ $x^{(2)}(i) = d^{(0)}(3i)$ $x^{(3)}(i) = d^{(0)}(3i+1)$ $x^{(6)}(i) = d^{(0)}(3i+2)$ $x^{(0)}(i) = d^{(1)}(4i)$ $x^{(1)}(i) = d^{(1)}(4i+1)$ $x^{(4)}(i) = d^{(1)}(4i+2)$ $x^{(5)}(i) = d^{(1)}(4i+3),$ $x^{(2)}(i) = d^{(0)}(3i)$ $x^{(4)}(i) = d^{(0)}(3i+1)$ $x^{(5)}(i) = d^{(0)}(3i+2)$ $x^{(0)}(i) = d^{(1)}(4i)$ $x^{(1)}(i) = d^{(1)}(4i+1)$ $x^{(3)}(i) = d^{(1)}(4i+2)$ $x^{(6)}(i) = d^{(1)}(4i+3),$ $x^{(2)}(i) = d^{(0)}(3i)$ $x^{(4)}(i) = d^{(0)}(3i+1)$ $x^{(6)}(i) = d^{(0)}(3i+2)$ $x^{(0)}(i) = d^{(1)}(4i)$ $x^{(1)}(i) = d^{(1)}(4i+1)$ $x^{(3)}(i) = d^{(1)}(4i+2)$ $x^{(5)}(i) = d^{(1)}(4i+3),$ $x^{(2)}(i) = d^{(0)}(3i)$ $x^{(5)}(i) = d^{(0)}(3i+1)$ $x^{(6)}(i) = d^{(0)}(3i+2)$ $x^{(0)}(i) = d^{(1)}(4i)$ $x^{(1)}(i) = d^{(1)}(4i+1)$ $x^{(3)}(i) = d^{(1)}(4i+2)$ $x^{(4)}(i) = d^{(1)}(4i+3),$ $x^{(3)}(i) = d^{(0)}(3i)$ $x^{(4)}(i) = d^{(0)}(3i+1)$ $x^{(5)}(i) = d^{(0)}(3i+2)$ $x^{(0)}(i) = d^{(1)}(4i)$ $x^{(1)}(i) = d^{(1)}(4i+1)$ $x^{(2)}(i) = d^{(1)}(4i+2)$ $x^{(6)}(i) = d^{(1)}(4i+3),$ $x^{(3)}(i) = d^{(0)}(3i)$ $x^{(4)}(i) = d^{(0)}(3i+1)$ $x^{(6)}(i) = d^{(0)}(3i+2)$ $x^{(0)}(i) = d^{(1)}(4i)$ $x^{(1)}(i) = d^{(1)}(4i+1)$ $x^{(2)}(i) = d^{(1)}(4i+2)$ $x^{(5)}(i) = d^{(1)}(4i+3),$ $x^{(3)}(i) = d^{(0)}(3i)$ $x^{(5)}(i) = d^{(0)}(3i+1)$ $x^{(6)}(i) = d^{(0)}(3i+2)$ $x^{(0)}(i) = d^{(1)}(4i)$ $x^{(1)}(i) = d^{(1)}(4i+1)$ $x^{(2)}(i) = d^{(1)}(4i+2)$ $x^{(4)}(i) = d^{(1)}(4i+3),$ $x^{(4)}(i) = d^{(0)}(3i)$ $x^{(5)}(i) = d^{(0)}(3i+1)$ $x^{(6)}(i) = d^{(0)}(3i+2)$ $x^{(0)}(i) = d^{(1)}(4i)$ $x^{(1)}(i) = d^{(1)}(4i+1)$ $x^{(2)}(i) = d^{(1)}(4i+2)$ $x^{(3)}(i) = d^{(1)}(4i+3),$

| | |
|---|---|
| $x^{(3)}(i) = d^{(0)}(4i)$ | $x^{(2)}(i) = d^{(0)}(4i)$ |
| $x^{(4)}(i) = d^{(0)}(4i+1)$ | $x^{(4)}(i) = d^{(0)}(4i+1)$ |
| $x^{(5)}(i) = d^{(0)}(4i+2)$ | $x^{(5)}(i) = d^{(0)}(4i+2)$ |
| $x^{(6)}(i) = d^{(0)}(4i+3),$ | $x^{(6)}(i) = d^{(0)}(4i+3),$ |
| $x^{(0)}(i) = d^{(1)}(3i)$ | $x^{(0)}(i) = d^{(1)}(3i)$ |
| $x^{(1)}(i) = d^{(1)}(3i+1)$ | $x^{(1)}(i) = d^{(1)}(3i+1)$ |
| $x^{(2)}(i) = d^{(1)}(3i+2)$ | $x^{(3)}(i) = d^{(1)}(3i+2)$ |

-continued $x^{(2)}(i) = d^{(0)}(4i)$  $x^{(2)}(i) = d^{(0)}(4i)$
$x^{(3)}(i) = d^{(0)}(4i+1)$  $x^{(3)}(i) = d^{(0)}(4i+1)$
$x^{(5)}(i) = d^{(0)}(4i+2)$  $x^{(4)}(i) = d^{(0)}(4i+2)$
$x^{(6)}(i) = d^{(0)}(4i+3)$,  $x^{(6)}(i) = d^{(0)}(4i+3)$,
$x^{(0)}(i) = d^{(1)}(3i)$  $x^{(0)}(i) = d^{(1)}(3i)$
$x^{(1)}(i) = d^{(1)}(3i+1)$  $x^{(1)}(i) = d^{(1)}(3i+1)$
$x^{(4)}(i) = d^{(1)}(3i+2)$  $x^{(5)}(i) = d^{(1)}(3i+2)$ $x^{(2)}(i) = d^{(0)}(4i)$  $x^{(1)}(i) = d^{(0)}(4i)$
$x^{(3)}(i) = d^{(0)}(4i+1)$  $x^{(4)}(i) = d^{(0)}(4i+1)$
$x^{(4)}(i) = d^{(0)}(4i+2)$  $x^{(5)}(i) = d^{(0)}(4i+2)$
$x^{(5)}(i) = d^{(0)}(4i+3)$,  $x^{(6)}(i) = d^{(0)}(4i+3)$,
$x^{(0)}(i) = d^{(1)}(3i)$  $x^{(0)}(i) = d^{(1)}(3i)$
$x^{(1)}(i) = d^{(1)}(3i+1)$  $x^{(2)}(i) = d^{(1)}(3i+1)$
$x^{(6)}(i) = d^{(1)}(3i+2)$  $x^{(3)}(i) = d^{(1)}(3i+2)$ $x^{(1)}(i) = d^{(0)}(4i)$  $x^{(1)}(i) = d^{(0)}(4i)$
$x^{(3)}(i) = d^{(0)}(4i+1)$  $x^{(3)}(i) = d^{(0)}(4i+1)$
$x^{(5)}(i) = d^{(0)}(4i+2)$  $x^{(4)}(i) = d^{(0)}(4i+2)$
$x^{(6)}(i) = d^{(0)}(4i+3)$,  $x^{(5)}(i) = d^{(0)}(4i+3)$,
$x^{(0)}(i) = d^{(1)}(3i)$  $x^{(0)}(i) = d^{(1)}(3i)$
$x^{(2)}(i) = d^{(1)}(3i+1)$  $x^{(2)}(i) = d^{(1)}(3i+1)$
$x^{(4)}(i) = d^{(1)}(3i+2)$  $x^{(5)}(i) = d^{(1)}(3i+2)$ $x^{(1)}(i) = d^{(0)}(4i)$  $x^{(1)}(i) = d^{(0)}(4i)$
$x^{(3)}(i) = d^{(0)}(4i+1)$  $x^{(2)}(i) = d^{(0)}(4i+1)$
$x^{(4)}(i) = d^{(0)}(4i+2)$  $x^{(5)}(i) = d^{(0)}(4i+2)$
$x^{(5)}(i) = d^{(0)}(4i+3)$,  $x^{(6)}(i) = d^{(0)}(4i+3)$,
$x^{(0)}(i) = d^{(1)}(3i)$  $x^{(0)}(i) = d^{(1)}(3i)$
$x^{(2)}(i) = d^{(1)}(3i+1)$  $x^{(3)}(i) = d^{(1)}(3i+1)$
$x^{(6)}(i) = d^{(1)}(3i+2)$  $x^{(4)}(i) = d^{(1)}(3i+2)$ $x^{(1)}(i) = d^{(0)}(4i)$  $x^{(1)}(i) = d^{(0)}(4i)$
$x^{(2)}(i) = d^{(0)}(4i+1)$  $x^{(2)}(i) = d^{(0)}(4i+1)$
$x^{(4)}(i) = d^{(0)}(4i+2)$  $x^{(4)}(i) = d^{(0)}(4i+2)$
$x^{(6)}(i) = d^{(0)}(4i+3)$,  $x^{(5)}(i) = d^{(0)}(4i+3)$,
$x^{(0)}(i) = d^{(1)}(3i)$  $x^{(0)}(i) = d^{(1)}(3i)$
$x^{(3)}(i) = d^{(1)}(3i+1)$  $x^{(3)}(i) = d^{(1)}(3i+1)$
$x^{(5)}(i) = d^{(1)}(3i+2)$  $x^{(6)}(i) = d^{(1)}(3i+2)$ -continued $x^{(1)}(i) = d^{(0)}(4i)$  $x^{(1)}(i) = d^{(0)}(4i)$
$x^{(2)}(i) = d^{(0)}(4i+1)$  $x^{(2)}(i) = d^{(0)}(4i+1)$
$x^{(3)}(i) = d^{(0)}(4i+2)$  $x^{(3)}(i) = d^{(0)}(4i+2)$
$x^{(6)}(i) = d^{(0)}(4i+3)$,  $x^{(5)}(i) = d^{(0)}(4i+3)$,
$x^{(0)}(i) = d^{(1)}(3i)$  $x^{(0)}(i) = d^{(1)}(3i)$
$x^{(4)}(i) = d^{(1)}(3i+1)$  $x^{(4)}(i) = d^{(1)}(3i+1)$
$x^{(5)}(i) = d^{(1)}(3i+2)$  $x^{(6)}(i) = d^{(1)}(3i+2)$ $x^{(1)}(i) = d^{(0)}(4i)$  $x^{(0)}(i) = d^{(0)}(4i)$
$x^{(2)}(i) = d^{(0)}(4i+1)$  $x^{(4)}(i) = d^{(0)}(4i+1)$
$x^{(3)}(i) = d^{(0)}(4i+2)$  $x^{(5)}(i) = d^{(0)}(4i+2)$
$x^{(4)}(i) = d^{(0)}(4i+3)$,  $x^{(6)}(i) = d^{(0)}(4i+3)$,
$x^{(0)}(i) = d^{(1)}(3i)$  $x^{(1)}(i) = d^{(1)}(3i)$
$x^{(5)}(i) = d^{(1)}(3i+1)$  $x^{(2)}(i) = d^{(1)}(3i+1)$
$x^{(6)}(i) = d^{(1)}(3i+2)$  $x^{(3)}(i) = d^{(1)}(3i+2)$ $x^{(0)}(i) = d^{(0)}(4i)$
$x^{(3)}(i) = d^{(0)}(4i+1)$
$x^{(5)}(i) = d^{(0)}(4i+2)$
$x^{(6)}(i) = d^{(0)}(4i+3)$
$x^{(1)}(i) = d^{(1)}(3i)$
$x^{(2)}(i) = d^{(1)}(3i+1)$
$x^{(4)}(i) = d^{(1)}(3i+2)$, $x^{(0)}(i) = d^{(0)}(4i)$
$x^{(3)}(i) = d^{(0)}(4i+1)$
$x^{(4)}(i) = d^{(0)}(4i+2)$
$x^{(5)}(i) = d^{(0)}(4i+3)$
$x^{(1)}(i) = d^{(1)}(3i)$
$x^{(2)}(i) = d^{(1)}(3i+1)$
$x^{(5)}(i) = d^{(1)}(3i+2)$, $x^{(0)}(i) = d^{(0)}(4i)$
$x^{(3)}(i) = d^{(0)}(4i+1)$
$x^{(4)}(i) = d^{(0)}(4i+2)$
$x^{(5)}(i) = d^{(0)}(4i+3)$
$x^{(1)}(i) = d^{(1)}(3i)$
$x^{(2)}(i) = d^{(1)}(3i+1)$
$x^{(6)}(i) = d^{(1)}(3i+2)$, $x^{(0)}(i) = d^{(0)}(4i)$
$x^{(2)}(i) = d^{(0)}(4i+1)$
$x^{(5)}(i) = d^{(0)}(4i+2)$
$x^{(6)}(i) = d^{(0)}(4i+3)$
$x^{(1)}(i) = d^{(1)}(3i)$
$x^{(3)}(i) = d^{(1)}(3i+1)$ $x^{(4)}(i) = d^{(1)}(3i+2),$ $x^{(0)}(i) = d^{(0)}(4i)$ $x^{(2)}(i) = d^{(0)}(4i+1)$ $x^{(4)}(i) = d^{(0)}(4i+2)$ $x^{(6)}(i) = d^{(0)}(4i+3)$ $x^{(1)}(i) = d^{(1)}(3i)$ $x^{(3)}(i) = d^{(1)}(3i+1)$ $x^{(5)}(i) = d^{(1)}(3i+2),$ $x^{(0)}(i) = d^{(0)}(4i)$ $x^{(2)}(i) = d^{(0)}(4i+1)$ $x^{(4)}(i) = d^{(0)}(4i+2)$ $x^{(5)}(i) = d^{(0)}(4i+3)$ $x^{(1)}(i) = d^{(1)}(3i)$ $x^{(3)}(i) = d^{(1)}(3i+1)$ $x^{(6)}(i) = d^{(1)}(3i+2),$ $x^{(0)}(i) = d^{(0)}(4i)$ $x^{(2)}(i) = d^{(0)}(4i+1)$ $x^{(3)}(i) = d^{(0)}(4i+2)$ $x^{(6)}(i) = d^{(0)}(4i+3)$ $x^{(1)}(i) = d^{(1)}(3i)$ $x^{(4)}(i) = d^{(1)}(3i+1)$ $x^{(5)}(i) = d^{(1)}(3i+2),$ $x^{(0)}(i) = d^{(0)}(4i)$ $x^{(2)}(i) = d^{(0)}(4i+1)$ $x^{(3)}(i) = d^{(0)}(4i+2)$ $x^{(5)}(i) = d^{(0)}(4i+3)$ $x^{(1)}(i) = d^{(1)}(3i)$ $x^{(4)}(i) = d^{(1)}(3i+1)$ $x^{(6)}(i) = d^{(1)}(3i+2),$ $x^{(0)}(i) = d^{(0)}(4i)$ $x^{(2)}(i) = d^{(0)}(4i+1)$ $x^{(3)}(i) = d^{(0)}(4i+2)$ $x^{(4)}(i) = d^{(0)}(4i+3)$ $x^{(1)}(i) = d^{(1)}(3i)$ $x^{(5)}(i) = d^{(1)}(3i+1)$ $x^{(6)}(i) = d^{(1)}(3i+2),$ $x^{(0)}(i) = d^{(0)}(4i)$ $x^{(1)}(i) = d^{(0)}(4i+1)$ $x^{(5)}(i) = d^{(0)}(4i+2)$ $x^{(6)}(i) = d^{(0)}(4i+3)$ $x^{(2)}(i) = d^{(1)}(3i)$ $x^{(3)}(i) = d^{(1)}(3i+1)$ $x^{(4)}(i) = d^{(1)}(3i+2),$ $x^{(0)}(i) = d^{(0)}(4i)$ $x^{(1)}(i) = d^{(0)}(4i+1)$ $x^{(4)}(i) = d^{(0)}(4i+2)$ $x^{(6)}(i) = d^{(0)}(4i+3)$ $x^{(2)}(i) = d^{(1)}(3i)$ $x^{(3)}(i) = d^{(1)}(3i+1)$ $x^{(5)}(i) = d^{(1)}(3i+2),$ $x^{(0)}(i) = d^{(0)}(4i)$ $x^{(1)}(i) = d^{(0)}(4i+1)$ $x^{(4)}(i) = d^{(0)}(4i+2)$ $x^{(5)}(i) = d^{(0)}(4i+3)$ $x^{(2)}(i) = d^{(1)}(3i)$ $x^{(3)}(i) = d^{(1)}(3i+1)$ $x^{(6)}(i) = d^{(1)}(3i+2),$ $x^{(0)}(i) = d^{(0)}(4i)$ $x^{(1)}(i) = d^{(0)}(4i+1)$ $x^{(3)}(i) = d^{(0)}(4i+2)$ $x^{(6)}(i) = d^{(0)}(4i+3)$ $x^{(2)}(i) = d^{(1)}(3i)$ $x^{(4)}(i) = d^{(1)}(3i+1)$ $x^{(5)}(i) = d^{(1)}(3i+2),$ $x^{(0)}(i) = d^{(0)}(4i)$ $x^{(1)}(i) = d^{(0)}(4i+1)$ $x^{(3)}(i) = d^{(0)}(4i+2)$ $x^{(5)}(i) = d^{(0)}(4i+3)$ $x^{(2)}(i) = d^{(1)}(3i)$ $x^{(4)}(i) = d^{(1)}(3i+1)$ $x^{(6)}(i) = d^{(1)}(3i+2),$ $x^{(0)}(i) = d^{(0)}(4i)$ $x^{(1)}(i) = d^{(0)}(4i+1)$ $x^{(3)}(i) = d^{(0)}(4i+2)$ $x^{(4)}(i) = d^{(0)}(4i+3)$ $x^{(2)}(i) = d^{(1)}(3i)$ $x^{(5)}(i) = d^{(1)}(3i+1)$ $x^{(6)}(i) = d^{(1)}(3i+2),$ $x^{(0)}(i) = d^{(0)}(4i)$ $x^{(1)}(i) = d^{(0)}(4i+1)$ $x^{(2)}(i) = d^{(0)}(4i+2)$ $x^{(6)}(i) = d^{(0)}(4i+3)$ $x^{(3)}(i) = d^{(1)}(3i)$ $x^{(4)}(i) = d^{(1)}(3i+1)$ $x^{(5)}(i) = d^{(1)}(3i+2),$ $x^{(0)}(i) = d^{(0)}(4i)$ $x^{(1)}(i) = d^{(0)}(4i+1)$ $x^{(2)}(i) = d^{(0)}(4i+2)$ $x^{(5)}(i) = d^{(0)}(4i+3)$ $x^{(3)}(i) = d^{(1)}(3i)$ $x^{(4)}(i) = d^{(1)}(3i+1)$ $x^{(6)}(i) = d^{(1)}(3i+2)$, $x^{(0)}(i) = d^{(0)}(4i)$ $x^{(1)}(i) = d^{(0)}(4i+1)$ $x^{(2)}(i) = d^{(0)}(4i+2)$ $x^{(4)}(i) = d^{(0)}(4i+3)$ $x^{(3)}(i) = d^{(1)}(3i)$ $x^{(5)}(i) = d^{(1)}(3i+1)$ $x^{(6)}(i) = d^{(1)}(3i+2)$, $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ $x^{(4)}(i) = d^{(1)}(3i)$ $x^{(5)}(i) = d^{(1)}(3i+1)$ $x^{(6)}(i) = d^{(1)}(3i+2)$, and $x^{(0)}(i) = d^{(0)}(7i)$ $x^{(1)}(i) = d^{(0)}(7i+1)$ $x^{(2)}(i) = d^{(0)}(7i+2)$ $x^{(5)}(i) = d^{(0)}(7i+3)$ $x^{(3)}(i) = d^{(0)}(7i+4)$ $x^{(4)}(i) = d^{(1)}(7i+5)$ $x^{(6)}(i) = d^{(1)}(7i+6)$, where the rank indication value is 7, $d^{(k)}(q)$ indicates the $q^{th}$ value of the $k^{th}$ codeword, $x^{(p)}(n)=d^{(k)}(q)$ indicates that the $q^{th}$ value of the $k^{th}$ codeword is mapped to the $m^{th}$ layer, and p is a quantity of layers. Alternatively, the first relationship set includes at least two of the following mapping relationships of mapping codewords to respective layers:

$x^{(0)}(i) = d^{(0)}(4i)$    $x^{(0)}(i) = d^{(0)}(4i)$    $x^{(0)}(i) = d^{(0)}(4i)$ $x^{(1)}(i) = d^{(0)}(4i+1)$    $x^{(1)}(i) = d^{(0)}(4i+1)$    $x^{(1)}(i) = d^{(0)}(4i+1)$ $x^{(2)}(i) = d^{(0)}(4i+2)$    $x^{(2)}(i) = d^{(0)}(4i+2)$    $x^{(2)}(i) = d^{(0)}(4i+2)$ $x^{(3)}(i) = d^{(0)}(4i+3)$    $x^{(4)}(i) = d^{(0)}(4i+3)$    $x^{(5)}(i) = d^{(0)}(4i+3)$ $x^{(4)}(i) = d^{(1)}(4i)$    $x^{(3)}(i) = d^{(1)}(4i)$    $x^{(3)}(i) = d^{(1)}(4i)$ , $x^{(5)}(i) = d^{(1)}(4i+1)$    $x^{(5)}(i) = d^{(1)}(4i+1)$    $x^{(4)}(i) = d^{(1)}(4i+1)$ $x^{(6)}(i) = d^{(1)}(4i+2)$    $x^{(6)}(i) = d^{(1)}(4i+2)$    $x^{(6)}(i) = d^{(1)}(4i+2)$ $x^{(7)}(i) = d^{(1)}(4i+3)$    $x^{(7)}(i) = d^{(1)}(4i+3)$    $x^{(7)}(i) = d^{(1)}(4i+3)$

-continued $x^{(0)}(i) = d^{(0)}(4i)$    $x^{(0)}(i) = d^{(0)}(4i)$ $x^{(1)}(i) = d^{(0)}(4i+1)$    $x^{(1)}(i) = d^{(0)}(4i+1)$ $x^{(2)}(i) = d^{(0)}(4i+2)$    $x^{(2)}(i) = d^{(0)}(4i+2)$ $x^{(6)}(i) = d^{(0)}(4i+3)$    $x^{(7)}(i) = d^{(0)}(4i+3)$ $x^{(3)}(i) = d^{(1)}(4i)$    $x^{(3)}(i) = d^{(1)}(4i)$ , $x^{(4)}(i) = d^{(1)}(4i+1)$    $x^{(4)}(i) = d^{(1)}(4i+1)$ $x^{(5)}(i) = d^{(1)}(4i+2)$    $x^{(5)}(i) = d^{(1)}(4i+2)$ $x^{(7)}(i) = d^{(1)}(4i+3)$    $x^{(6)}(i) = d^{(1)}(4i+3)$ $x^{(0)}(i) = d^{(0)}(4i)$    $x^{(0)}(i) = d^{(0)}(4i)$ $x^{(1)}(i) = d^{(0)}(4i+1)$    $x^{(1)}(i) = d^{(0)}(4i+1)$ $x^{(3)}(i) = d^{(0)}(4i+2)$    $x^{(3)}(i) = d^{(0)}(4i+2)$ $x^{(4)}(i) = d^{(0)}(4i+3)$    $x^{(5)}(i) = d^{(0)}(4i+3)$ $x^{(2)}(i) = d^{(1)}(4i)$    $x^{(2)}(i) = d^{(1)}(4i)$ , $x^{(5)}(i) = d^{(1)}(4i+1)$    $x^{(4)}(i) = d^{(1)}(4i+1)$ $x^{(6)}(i) = d^{(1)}(4i+2)$    $x^{(6)}(i) = d^{(1)}(4i+2)$ $x^{(7)}(i) = d^{(1)}(4i+3)$    $x^{(7)}(i) = d^{(1)}(4i+3)$ $x^{(0)}(i) = d^{(0)}(4i)$ $x^{(1)}(i) = d^{(0)}(4i+1)$ $x^{(3)}(i) = d^{(0)}(4i+2)$ $x^{(6)}(i) = d^{(0)}(4i+3)$ $x^{(2)}(i) = d^{(1)}(4i)$ $x^{(4)}(i) = d^{(1)}(4i+1)$ $x^{(5)}(i) = d^{(1)}(4i+2)$ $x^{(7)}(i) = d^{(1)}(4i+3)$, $x^{(0)}(i) = d^{(0)}(4i)$ $x^{(1)}(i) = d^{(0)}(4i+1)$ $x^{(3)}(i) = d^{(0)}(4i+2)$ $x^{(7)}(i) = d^{(0)}(4i+3)$ $x^{(2)}(i) = d^{(1)}(4i)$ $x^{(4)}(i) = d^{(1)}(4i+1)$ $x^{(5)}(i) = d^{(1)}(4i+2)$ $x^{(6)}(i) = d^{(1)}(4i+3)$, $x^{(0)}(i) = d^{(0)}(4i)$ $x^{(1)}(i) = d^{(0)}(4i+1)$ $x^{(4)}(i) = d^{(0)}(4i+2)$ $x^{(5)}(i) = d^{(0)}(4i+3)$ $x^{(2)}(i) = d^{(1)}(4i)$ $x^{(3)}(i) = d^{(1)}(4i+1)$ $x^{(6)}(i) = d^{(1)}(4i+2)$ $x^{(7)}(i) = d^{(1)}(4i+3)$, $x^{(0)}(i) = d^{(0)}(4i)$ $x^{(1)}(i) = d^{(0)}(4i+1)$ $x^{(4)}(i) = d^{(0)}(4i+2)$ $x^{(6)}(i) = d^{(0)}(4i+3)$ $x^{(2)}(i) = d^{(1)}(4i)$ $x^{(3)}(i) = d^{(1)}(4i+1)$ $x^{(5)}(i) = d^{(1)}(4i+2)$ $x^{(7)}(i) = d^{(1)}(4i+3),$ $x^{(0)}(i) = d^{(0)}(4i)$ $x^{(1)}(i) = d^{(0)}(4i+1)$ $x^{(4)}(i) = d^{(0)}(4i+2)$ $x^{(7)}(i) = d^{(0)}(4i+3)$ $x^{(2)}(i) = d^{(1)}(4i)$ $x^{(3)}(i) = d^{(1)}(4i+1)$ $x^{(5)}(i) = d^{(1)}(4i+2)$ $x^{(6)}(i) = d^{(1)}(4i+3),$ $x^{(0)}(i) = d^{(0)}(4i)$ $x^{(1)}(i) = d^{(0)}(4i+1)$ $x^{(5)}(i) = d^{(0)}(4i+2)$ $x^{(6)}(i) = d^{(0)}(4i+3)$ $x^{(2)}(i) = d^{(1)}(4i)$ $x^{(3)}(i) = d^{(1)}(4i+1)$ $x^{(4)}(i) = d^{(1)}(4i+2)$ $x^{(7)}(i) = d^{(1)}(4i+3),$ $x^{(0)}(i) = d^{(0)}(4i)$ $x^{(1)}(i) = d^{(0)}(4i+1)$ $x^{(5)}(i) = d^{(0)}(4i+2)$ $x^{(7)}(i) = d^{(0)}(4i+3)$ $x^{(2)}(i) = d^{(1)}(4i)$ $x^{(3)}(i) = d^{(1)}(4i+1)$ $x^{(4)}(i) = d^{(1)}(4i+2)$ $x^{(6)}(i) = d^{(1)}(4i+3),$ $x^{(0)}(i) = d^{(0)}(4i)$ $x^{(1)}(i) = d^{(0)}(4i+1)$ $x^{(6)}(i) = d^{(0)}(4i+2)$ $x^{(7)}(i) = d^{(0)}(4i+3)$ $x^{(2)}(i) = d^{(1)}(4i)$ $x^{(3)}(i) = d^{(1)}(4i+1)$ $x^{(4)}(i) = d^{(1)}(4i+2)$ $x^{(5)}(i) = d^{(1)}(4i+3),$ $x^{(0)}(i) = d^{(0)}(4i)$ $x^{(2)}(i) = d^{(0)}(4i+1)$ $x^{(3)}(i) = d^{(0)}(4i+2)$ $x^{(4)}(i) = d^{(0)}(4i+3)$ $x^{(1)}(i) = d^{(1)}(4i)$ $x^{(5)}(i) = d^{(1)}(4i+1)$ $x^{(6)}(i) = d^{(1)}(4i+2)$ $x^{(7)}(i) = d^{(1)}(4i+3),$ $x^{(0)}(i) = d^{(0)}(4i)$ $x^{(2)}(i) = d^{(0)}(4i+1)$ $x^{(3)}(i) = d^{(0)}(4i+2)$ $x^{(5)}(i) = d^{(0)}(4i+3)$ $x^{(1)}(i) = d^{(1)}(4i)$ $x^{(4)}(i) = d^{(1)}(4i+1)$ $x^{(6)}(i) = d^{(1)}(4i+2)$ $x^{(7)}(i) = d^{(1)}(4i+3),$ $x^{(0)}(i) = d^{(0)}(4i)$ $x^{(2)}(i) = d^{(0)}(4i+1)$ $x^{(3)}(i) = d^{(0)}(4i+2)$ $x^{(6)}(i) = d^{(0)}(4i+3)$ $x^{(1)}(i) = d^{(1)}(4i)$ $x^{(4)}(i) = d^{(1)}(4i+1)$ $x^{(5)}(i) = d^{(1)}(4i+2)$ $x^{(7)}(i) = d^{(1)}(4i+3),$ $x^{(0)}(i) = d^{(0)}(4i)$ $x^{(2)}(i) = d^{(0)}(4i+1)$ $x^{(3)}(i) = d^{(0)}(4i+2)$ $x^{(7)}(i) = d^{(0)}(4i+3)$ $x^{(1)}(i) = d^{(1)}(4i)$ $x^{(4)}(i) = d^{(1)}(4i+1)$ $x^{(5)}(i) = d^{(1)}(4i+2)$ $x^{(6)}(i) = d^{(1)}(4i+3),$ $x^{(0)}(i) = d^{(0)}(4i)$ $x^{(2)}(i) = d^{(0)}(4i+1)$ $x^{(4)}(i) = d^{(0)}(4i+2)$ $x^{(5)}(i) = d^{(0)}(4i+3)$ $x^{(1)}(i) = d^{(1)}(4i)$ $x^{(3)}(i) = d^{(1)}(4i+1)$ $x^{(6)}(i) = d^{(1)}(4i+2)$ $x^{(7)}(i) = d^{(1)}(4i+3),$ $x^{(0)}(i) = d^{(0)}(4i)$ $x^{(2)}(i) = d^{(0)}(4i+1)$ $x^{(4)}(i) = d^{(0)}(4i+2)$ $x^{(6)}(i) = d^{(0)}(4i+3)$ $x^{(1)}(i) = d^{(1)}(4i)$ $x^{(3)}(i) = d^{(1)}(4i+1)$ $x^{(5)}(i) = d^{(1)}(4i+2)$ $x^{(7)}(i) = d^{(1)}(4i+3),$ $x^{(0)}(i) = d^{(0)}(4i)$ $x^{(2)}(i) = d^{(0)}(4i+1)$ $x^{(4)}(i) = d^{(0)}(4i+2)$ $x^{(7)}(i) = d^{(0)}(4i+3)$ $x^{(1)}(i) = d^{(1)}(4i)$ $x^{(3)}(i) = d^{(1)}(4i+1)$ $x^{(5)}(i) = d^{(1)}(4i+2)$ $x^{(6)}(i) = d^{(1)}(4i+3),$ $x^{(0)}(i) = d^{(0)}(4i)$ $x^{(2)}(i) = d^{(0)}(4i+1)$ $x^{(5)}(i) = d^{(0)}(4i+2)$ $x^{(6)}(i) = d^{(0)}(4i+3)$ $x^{(1)}(i) = d^{(1)}(4i)$ $x^{(3)}(i) = d^{(1)}(4i+1)$ $x^{(4)}(i) = d^{(1)}(4i+2)$ $x^{(7)}(i) = d^{(1)}(4i+3),$ $x^{(0)}(i) = d^{(0)}(4i)$ $x^{(2)}(i) = d^{(0)}(4i+1)$ $x^{(5)}(i) = d^{(0)}(4i+2)$ $x^{(7)}(i) = d^{(0)}(4i+3)$ $x^{(1)}(i) = d^{(1)}(4i)$ $x^{(3)}(i) = d^{(1)}(4i+1)$ $x^{(4)}(i) = d^{(1)}(4i+2)$ $x^{(6)}(i) = d^{(1)}(4i+3),$ $x^{(0)}(i) = d^{(0)}(4i)$ $x^{(2)}(i) = d^{(0)}(4i+1)$ $x^{(6)}(i) = d^{(0)}(4i+2)$ $x^{(7)}(i) = d^{(0)}(4i+3)$ $x^{(1)}(i) = d^{(1)}(4i)$ $x^{(3)}(i) = d^{(1)}(4i+1)$ $x^{(4)}(i) = d^{(1)}(4i+2)$ $x^{(5)}(i) = d^{(1)}(4i+3),$ $x^{(0)}(i) = d^{(0)}(4i)$ $x^{(3)}(i) = d^{(0)}(4i+1)$ $x^{(4)}(i) = d^{(0)}(4i+2)$ $x^{(5)}(i) = d^{(0)}(4i+3)$ $x^{(1)}(i) = d^{(1)}(4i)$ $x^{(2)}(i) = d^{(1)}(4i+1)$ $x^{(6)}(i) = d^{(1)}(4i+2)$ $x^{(7)}(i) = d^{(1)}(4i+3),$ $x^{(0)}(i) = d^{(0)}(4i)$ $x^{(3)}(i) = d^{(0)}(4i+1)$ $x^{(4)}(i) = d^{(0)}(4i+2)$ $x^{(6)}(i) = d^{(0)}(4i+3)$ $x^{(1)}(i) = d^{(1)}(4i)$ $x^{(2)}(i) = d^{(1)}(4i+1)$ $x^{(5)}(i) = d^{(1)}(4i+2)$ $x^{(7)}(i) = d^{(1)}(4i+3),$ $x^{(0)}(i) = d^{(0)}(4i)$ $x^{(3)}(i) = d^{(0)}(4i+1)$ $x^{(4)}(i) = d^{(0)}(4i+2)$ $x^{(7)}(i) = d^{(0)}(4i+3)$ $x^{(1)}(i) = d^{(1)}(4i)$ $x^{(2)}(i) = d^{(1)}(4i+1)$ $x^{(5)}(i) = d^{(1)}(4i+2)$ $x^{(6)}(i) = d^{(1)}(4i+3),$ $x^{(0)}(i) = d^{(0)}(4i)$ $x^{(3)}(i) = d^{(0)}(4i+1)$ $x^{(5)}(i) = d^{(0)}(4i+2)$ $x^{(6)}(i) = d^{(0)}(4i+3)$ $x^{(1)}(i) = d^{(1)}(4i)$ $x^{(2)}(i) = d^{(1)}(4i+1)$ $x^{(4)}(i) = d^{(1)}(4i+2)$ $x^{(7)}(i) = d^{(1)}(4i+3),$ $x^{(0)}(i) = d^{(0)}(4i)$ $x^{(3)}(i) = d^{(0)}(4i+1)$ $x^{(5)}(i) = d^{(0)}(4i+2)$ $x^{(7)}(i) = d^{(0)}(4i+3)$ $x^{(1)}(i) = d^{(1)}(4i)$ $x^{(2)}(i) = d^{(1)}(4i+1)$ $x^{(4)}(i) = d^{(1)}(4i+2)$ $x^{(6)}(i) = d^{(1)}(4i+3),$ $x^{(0)}(i) = d^{(0)}(4i)$ $x^{(3)}(i) = d^{(0)}(4i+1)$ $x^{(6)}(i) = d^{(0)}(4i+2)$ $x^{(7)}(i) = d^{(0)}(4i+3)$ $x^{(1)}(i) = d^{(1)}(4i)$ $x^{(2)}(i) = d^{(1)}(4i+1)$ $x^{(4)}(i) = d^{(1)}(4i+2)$ $x^{(5)}(i) = d^{(1)}(4i+3),$ $x^{(0)}(i) = d^{(0)}(4i)$ $x^{(4)}(i) = d^{(0)}(4i+1)$ $x^{(5)}(i) = d^{(0)}(4i+2)$ $x^{(6)}(i) = d^{(0)}(4i+3)$ $x^{(1)}(i) = d^{(1)}(4i)$ $x^{(2)}(i) = d^{(1)}(4i+1)$ $x^{(3)}(i) = d^{(1)}(4i+2)$ $x^{(7)}(i) = d^{(1)}(4i+3),$ $x^{(0)}(i) = d^{(0)}(4i)$ $x^{(4)}(i) = d^{(0)}(4i+1)$ $x^{(5)}(i) = d^{(0)}(4i+2)$ $x^{(7)}(i) = d^{(0)}(4i+3)$ $x^{(1)}(i) = d^{(1)}(4i)$ $x^{(2)}(i) = d^{(1)}(4i+1)$ $x^{(3)}(i) = d^{(1)}(4i+2)$ $x^{(6)}(i) = d^{(1)}(4i+3),$ $x^{(0)}(i) = d^{(0)}(4i)$ $x^{(4)}(i) = d^{(0)}(4i+1)$ $x^{(6)}(i) = d^{(0)}(4i+2)$ $x^{(7)}(i) = d^{(0)}(4i+3)$ $x^{(1)}(i) = d^{(1)}(4i)$ $x^{(2)}(i) = d^{(1)}(4i+1)$ $x^{(3)}(i) = d^{(1)}(4i+2)$ $x^{(5)}(i) = d^{(1)}(4i+3),$ $x^{(0)}(i) = d^{(0)}(4i)$ $x^{(5)}(i) = d^{(0)}(4i+1)$ $x^{(6)}(i) = d^{(0)}(4i+2)$ $x^{(7)}(i) = d^{(0)}(4i+3)$ $x^{(1)}(i) = d^{(1)}(4i)$ $x^{(2)}(i) = d^{(1)}(4i+1)$ $x^{(3)}(i) = d^{(1)}(4i+2)$ $x^{(4)}(i) = d^{(1)}(4i+3),$ $x^{(1)}(i) = d^{(0)}(4i)$ $x^{(2)}(i) = d^{(0)}(4i+1)$ $x^{(3)}(i) = d^{(0)}(4i+2)$ $x^{(4)}(i) = d^{(0)}(4i+3)$ $x^{(0)}(i) = d^{(1)}(4i)$ $x^{(5)}(i) = d^{(1)}(4i+1)$ $x^{(6)}(i) = d^{(1)}(4i+2)$ $x^{(7)}(i) = d^{(1)}(4i+3),$ $x^{(1)}(i) = d^{(0)}(4i)$ $x^{(2)}(i) = d^{(0)}(4i+1)$ $x^{(3)}(i) = d^{(0)}(4i+2)$ $x^{(5)}(i) = d^{(0)}(4i+3)$ $x^{(0)}(i) = d^{(1)}(4i)$ $x^{(4)}(i) = d^{(1)}(4i+1)$ $x^{(6)}(i) = d^{(1)}(4i+2)$ $x^{(7)}(i) = d^{(1)}(4i+3),$ $x^{(1)}(i) = d^{(0)}(4i)$ $x^{(2)}(i) = d^{(0)}(4i+1)$ $x^{(5)}(i) = d^{(0)}(4i+2)$ $x^{(3)}(i) = d^{(0)}(4i+2)$ $x^{(6)}(i) = d^{(0)}(4i+3)$ $x^{(0)}(i) = d^{(1)}(4i)$ $x^{(4)}(i) = d^{(1)}(4i+1)$ $x^{(5)}(i) = d^{(1)}(4i+2)$ $x^{(7)}(i) = d^{(1)}(4i+3),$ $x^{(1)}(i) = d^{(0)}(4i)$ $x^{(2)}(i) = d^{(0)}(4i+1)$ $x^{(3)}(i) = d^{(0)}(4i+2)$ $x^{(7)}(i) = d^{(0)}(4i+3)$ $x^{(0)}(i) = d^{(1)}(4i)$ $x^{(4)}(i) = d^{(1)}(4i+1)$ $x^{(5)}(i) = d^{(1)}(4i+2)$ $x^{(6)}(i) = d^{(1)}(4i+3),$ $x^{(1)}(i) = d^{(0)}(4i)$ $x^{(2)}(i) = d^{(0)}(4i+1)$ $x^{(4)}(i) = d^{(0)}(4i+2)$ $x^{(5)}(i) = d^{(0)}(4i+3)$ $x^{(0)}(i) = d^{(1)}(4i)$ $x^{(3)}(i) = d^{(1)}(4i+1)$ $x^{(6)}(i) = d^{(1)}(4i+2)$ $x^{(7)}(i) = d^{(1)}(4i+3),$ $x^{(1)}(i) = d^{(0)}(4i)$ $x^{(2)}(i) = d^{(0)}(4i+1)$ $x^{(4)}(i) = d^{(0)}(4i+2)$ $x^{(6)}(i) = d^{(0)}(4i+3)$ $x^{(0)}(i) = d^{(1)}(4i)$ $x^{(3)}(i) = d^{(1)}(4i+1)$ $x^{(5)}(i) = d^{(1)}(4i+2)$ $x^{(7)}(i) = d^{(1)}(4i+3),$ $x^{(1)}(i) = d^{(0)}(4i)$ $x^{(2)}(i) = d^{(0)}(4i+1)$ $x^{(4)}(i) = d^{(0)}(4i+2)$ $x^{(7)}(i) = d^{(0)}(4i+3)$ $x^{(0)}(i) = d^{(1)}(4i)$ $x^{(3)}(i) = d^{(1)}(4i+1)$ $x^{(5)}(i) = d^{(1)}(4i+2)$ $x^{(6)}(i) = d^{(1)}(4i+3),$ $x^{(1)}(i) = d^{(0)}(4i)$ $x^{(2)}(i) = d^{(0)}(4i+1)$ $x^{(5)}(i) = d^{(0)}(4i+2)$ -continued $x^{(6)}(i) = d^{(0)}(4i+3)$ $x^{(0)}(i) = d^{(0)}(4i)$ $x^{(3)}(i) = d^{(1)}(4i+1)$ $x^{(4)}(i) = d^{(1)}(4i+2)$ $x^{(7)}(i) = d^{(1)}(4i+3),$ $x^{(1)}(i) = d^{(0)}(4i)$ $x^{(2)}(i) = d^{(0)}(4i+1)$ $x^{(5)}(i) = d^{(0)}(4i+2)$ $x^{(7)}(i) = d^{(0)}(4i+3)$ $x^{(0)}(i) = d^{(1)}(4i)$ $x^{(3)}(i) = d^{(1)}(4i+1)$ $x^{(4)}(i) = d^{(1)}(4i+2)$ $x^{(6)}(i) = d^{(1)}(4i+3),$ $x^{(1)}(i) = d^{(0)}(4i)$ $x^{(2)}(i) = d^{(0)}(4i+1)$ $x^{(6)}(i) = d^{(0)}(4i+2)$ $x^{(7)}(i) = d^{(0)}(4i+3)$ $x^{(0)}(i) = d^{(1)}(4i)$ $x^{(3)}(i) = d^{(1)}(4i+1)$ $x^{(4)}(i) = d^{(1)}(4i+2)$ $x^{(5)}(i) = d^{(1)}(4i+3),$ $x^{(1)}(i) = d^{(0)}(4i)$ $x^{(3)}(i) = d^{(0)}(4i+1)$ $x^{(4)}(i) = d^{(0)}(4i+2)$ $x^{(5)}(i) = d^{(0)}(4i+3)$ $x^{(0)}(i) = d^{(1)}(4i)$ $x^{(2)}(i) = d^{(1)}(4i+1)$ $x^{(6)}(i) = d^{(1)}(4i+2)$ $x^{(7)}(i) = d^{(1)}(4i+3),$ $x^{(1)}(i) = d^{(0)}(4i)$ $x^{(3)}(i) = d^{(0)}(4i+1)$ $x^{(4)}(i) = d^{(0)}(4i+2)$ $x^{(6)}(i) = d^{(0)}(4i+3)$ $x^{(0)}(i) = d^{(1)}(4i)$ $x^{(2)}(i) = d^{(1)}(4i+1)$ $x^{(5)}(i) = d^{(1)}(4i+2)$ $x^{(7)}(i) = d^{(1)}(4i+3),$ $x^{(1)}(i) = d^{(0)}(4i)$ $x^{(3)}(i) = d^{(0)}(4i+1)$ $x^{(4)}(i) = d^{(0)}(4i+2)$ $x^{(7)}(i) = d^{(0)}(4i+3)$ $x^{(0)}(i) = d^{(1)}(4i)$ $x^{(2)}(i) = d^{(1)}(4i+1)$ $x^{(5)}(i) = d^{(1)}(4i+2)$ -continued $x^{(6)}(i) = d^{(1)}(4i+3),$ $x^{(1)}(i) = d^{(0)}(4i)$ $x^{(3)}(i) = d^{(0)}(4i+1)$ $x^{(5)}(i) = d^{(0)}(4i+2)$ $x^{(6)}(i) = d^{(0)}(4i+3)$ $x^{(0)}(i) = d^{(1)}(4i)$ $x^{(2)}(i) = d^{(1)}(4i+1)$ $x^{(4)}(i) = d^{(1)}(4i+2)$ $x^{(7)}(i) = d^{(1)}(4i+3),$ $x^{(1)}(i) = d^{(0)}(4i)$ $x^{(3)}(i) = d^{(0)}(4i+1)$ $x^{(5)}(i) = d^{(0)}(4i+2)$ $x^{(7)}(i) = d^{(0)}(4i+3)$ $x^{(0)}(i) = d^{(1)}(4i)$ $x^{(2)}(i) = d^{(1)}(4i+1)$ $x^{(4)}(i) = d^{(1)}(4i+2)$ $x^{(6)}(i) = d^{(1)}(4i+3),$ $x^{(1)}(i) = d^{(0)}(4i)$ $x^{(3)}(i) = d^{(0)}(4i+1)$ $x^{(6)}(i) = d^{(0)}(4i+2)$ $x^{(7)}(i) = d^{(0)}(4i+3)$ $x^{(0)}(i) = d^{(1)}(4i)$ $x^{(2)}(i) = d^{(1)}(4i+1)$ $x^{(4)}(i) = d^{(1)}(4i+2)$ $x^{(5)}(i) = d^{(1)}(4i+3),$ $x^{(1)}(i) = d^{(0)}(4i)$ $x^{(4)}(i) = d^{(0)}(4i+1)$ $x^{(5)}(i) = d^{(0)}(4i+2)$ $x^{(6)}(i) = d^{(0)}(4i+3)$ $x^{(0)}(i) = d^{(1)}(4i)$ $x^{(2)}(i) = d^{(1)}(4i+1)$ $x^{(3)}(i) = d^{(1)}(4i+2)$ $x^{(7)}(i) = d^{(1)}(4i+3),$ $x^{(1)}(i) = d^{(0)}(4i)$ $x^{(4)}(i) = d^{(0)}(4i+1)$ $x^{(5)}(i) = d^{(0)}(4i+2)$ $x^{(7)}(i) = d^{(0)}(4i+3)$ $x^{(0)}(i) = d^{(1)}(4i)$ $x^{(2)}(i) = d^{(1)}(4i+1)$ $x^{(3)}(i) = d^{(1)}(4i+2)$ $x^{(6)}(i) = d^{(1)}(4i+3),$ $x^{(1)}(i) = d^{(0)}(4i)$ $x^{(4)}(i) = d^{(0)}(4i+1)$ $x^{(6)}(i) = d^{(0)}(4i+2)$ -continued $x^{(7)}(i) = d^{(0)}(4i+3)$ $x^{(0)}(i) = d^{(1)}(4i)$ $x^{(2)}(i) = d^{(1)}(4i+1)$ $x^{(3)}(i) = d^{(1)}(4i+2)$ $x^{(5)}(i) = d^{(1)}(4i+3),$ $x^{(1)}(i) = d^{(0)}(4i)$ $x^{(5)}(i) = d^{(0)}(4i+1)$ $x^{(6)}(i) = d^{(0)}(4i+2)$ $x^{(7)}(i) = d^{(0)}(4i+3)$ $x^{(0)}(i) = d^{(1)}(4i)$ $x^{(2)}(i) = d^{(1)}(4i+1)$ $x^{(3)}(i) = d^{(1)}(4i+2)$ $x^{(4)}(i) = d^{(1)}(4i+3),$ $x^{(2)}(i) = d^{(0)}(4i)$ $x^{(3)}(i) = d^{(0)}(4i+1)$ $x^{(4)}(i) = d^{(0)}(4i+2)$ $x^{(5)}(i) = d^{(0)}(4i+3)$ $x^{(0)}(i) = d^{(1)}(4i)$ $x^{(1)}(i) = d^{(1)}(4i+1)$ $x^{(6)}(i) = d^{(1)}(4i+2)$ $x^{(7)}(i) = d^{(1)}(4i+3),$ $x^{(2)}(i) = d^{(0)}(4i)$ $x^{(3)}(i) = d^{(0)}(4i+1)$ $x^{(4)}(i) = d^{(0)}(4i+2)$ $x^{(6)}(i) = d^{(0)}(4i+3)$ $x^{(0)}(i) = d^{(1)}(4i)$ $x^{(1)}(i) = d^{(1)}(4i+1)$ $x^{(5)}(i) = d^{(1)}(4i+2)$ $x^{(7)}(i) = d^{(1)}(4i+3),$ $x^{(2)}(i) = d^{(0)}(4i)$ $x^{(3)}(i) = d^{(0)}(4i+1)$ $x^{(4)}(i) = d^{(0)}(4i+2)$ $x^{(7)}(i) = d^{(0)}(4i+3)$ $x^{(0)}(i) = d^{(1)}(4i)$ $x^{(1)}(i) = d^{(1)}(4i+1)$ $x^{(5)}(i) = d^{(1)}(4i+2)$ $x^{(6)}(i) = d^{(1)}(4i+3),$ $x^{(2)}(i) = d^{(0)}(4i)$ $x^{(3)}(i) = d^{(0)}(4i+1)$ $x^{(5)}(i) = d^{(0)}(4i+2)$ $x^{(6)}(i) = d^{(0)}(4i+3)$ -continued $x^{(0)}(i) = d^{(1)}(4i)$ $x^{(1)}(i) = d^{(1)}(4i+1)$ $x^{(4)}(i) = d^{(1)}(4i+2)$ $x^{(7)}(i) = d^{(1)}(4i+3),$ $x^{(2)}(i) = d^{(0)}(4i)$ $x^{(3)}(i) = d^{(0)}(4i+1)$ $x^{(5)}(i) = d^{(0)}(4i+2)$ $x^{(7)}(i) = d^{(0)}(4i+3)$ $x^{(0)}(i) = d^{(1)}(4i)$ $x^{(1)}(i) = d^{(1)}(4i+1)$ $x^{(4)}(i) = d^{(1)}(4i+2)$ $x^{(6)}(i) = d^{(1)}(4i+3),$ $x^{(2)}(i) = d^{(0)}(4i)$ $x^{(3)}(i) = d^{(0)}(4i+1)$ $x^{(6)}(i) = d^{(0)}(4i+2)$ $x^{(7)}(i) = d^{(0)}(4i+3)$ $x^{(0)}(i) = d^{(1)}(4i)$ $x^{(1)}(i) = d^{(1)}(4i+1)$ $x^{(4)}(i) = d^{(1)}(4i+2)$ $x^{(5)}(i) = d^{(1)}(4i+3),$ $x^{(2)}(i) = d^{(0)}(4i)$ $x^{(4)}(i) = d^{(0)}(4i+1)$ $x^{(5)}(i) = d^{(0)}(4i+2)$ $x^{(6)}(i) = d^{(0)}(4i+3)$ $x^{(0)}(i) = d^{(1)}(4i)$ $x^{(1)}(i) = d^{(1)}(4i+1)$ $x^{(3)}(i) = d^{(1)}(4i+2)$ $x^{(7)}(i) = d^{(1)}(4i+3),$ $x^{(2)}(i) = d^{(0)}(4i)$ $x^{(4)}(i) = d^{(0)}(4i+1)$ $x^{(5)}(i) = d^{(0)}(4i+2)$ $x^{(7)}(i) = d^{(0)}(4i+3)$ $x^{(0)}(i) = d^{(1)}(4i)$ $x^{(1)}(i) = d^{(1)}(4i+1)$ $x^{(3)}(i) = d^{(1)}(4i+2)$ $x^{(6)}(i) = d^{(1)}(4i+3),$ $x^{(2)}(i) = d^{(0)}(4i)$ $x^{(4)}(i) = d^{(0)}(4i+1)$ $x^{(6)}(i) = d^{(0)}(4i+2)$ $x^{(7)}(i) = d^{(0)}(4i+3)$ $x^{(0)}(i) = d^{(1)}(4i)$ $x^{(1)}(i) = d^{(1)}(4i+1)$ $x^{(3)}(i) = d^{(1)}(4i+2)$ $x^{(5)}(i) = d^{(1)}(4i+3),$ -continued $x^{(2)}(i) = d^{(0)}(4i)$ $x^{(5)}(i) = d^{(0)}(4i+1)$ $x^{(6)}(i) = d^{(0)}(4i+2)$ $x^{(7)}(i) = d^{(0)}(4i+3)$ $x^{(0)}(i) = d^{(1)}(4i)$ $x^{(1)}(i) = d^{(1)}(4i+1)$ $x^{(3)}(i) = d^{(1)}(4i+2)$ $x^{(4)}(i) = d^{(1)}(4i+3)$, $x^{(3)}(i) = d^{(0)}(4i)$ $x^{(4)}(i) = d^{(0)}(4i+1)$ $x^{(5)}(i) = d^{(0)}(4i+2)$ $x^{(6)}(i) = d^{(0)}(4i+3)$ $x^{(0)}(i) = d^{(1)}(4i)$ $x^{(1)}(i) = d^{(1)}(4i+1)$ $x^{(2)}(i) = d^{(1)}(4i+2)$ $x^{(7)}(i) = d^{(1)}(4i+3)$, $x^{(3)}(i) = d^{(0)}(4i)$ $x^{(4)}(i) = d^{(0)}(4i+1)$ $x^{(5)}(i) = d^{(0)}(4i+2)$ $x^{(7)}(i) = d^{(0)}(4i+3)$ $x^{(0)}(i) = d^{(1)}(4i)$ $x^{(1)}(i) = d^{(1)}(4i+1)$ $x^{(2)}(i) = d^{(1)}(4i+2)$ $x^{(6)}(i) = d^{(1)}(4i+3)$, $x^{(3)}(i) = d^{(0)}(4i)$ $x^{(4)}(i) = d^{(0)}(4i+1)$ $x^{(6)}(i) = d^{(0)}(4i+2)$ $x^{(7)}(i) = d^{(0)}(4i+3)$ $x^{(0)}(i) = d^{(1)}(4i)$ $x^{(1)}(i) = d^{(1)}(4i+1)$ $x^{(2)}(i) = d^{(1)}(4i+2)$ $x^{(5)}(i) = d^{(1)}(4i+3)$, $x^{(3)}(i) = d^{(0)}(4i)$ $x^{(5)}(i) = d^{(0)}(4i+1)$ $x^{(6)}(i) = d^{(0)}(4i+2)$ $x^{(7)}(i) = d^{(0)}(4i+3)$ $x^{(0)}(i) = d^{(1)}(4i)$ $x^{(1)}(i) = d^{(1)}(4i+1)$ $x^{(2)}(i) = d^{(1)}(4i+2)$ $x^{(3)}(i) = d^{(1)}(4i+3)$, and $x^{(0)}(i) = d^{(0)}(8i)$ $x^{(1)}(i) = d^{(0)}(8i+1)$ $x^{(2)}(i) = d^{(0)}(8i+2)$ $x^{(3)}(i) = d^{(0)}(8i+3)$ $x^{(4)}(i) = d^{(0)}(8i+4)$ $x^{(5)}(i) = d^{(0)}(8i+5)$ $x^{(6)}(i) = d^{(0)}(8i+6)$ $x^{(7)}(i) = d^{(0)}(8i+7)$, where $d^{(k)}(q)$ indicates the $q^{th}$ value of the $k^{th}$ codeword, $x^{(p)}(n)=d^{(k)}(q)$ indicates that the $q^{th}$ value of the $k^{th}$ codeword is mapped to the $m^{th}$ layer, p is a quantity of layers, and the rank indication value is 8.

Step 104: Send a notification message to the network device, where the notification message is used to indicate the mapping relationship.

It should be understood that the present invention provides mapping relationships that may exist in cases in which rank indications are 2 to 8 and that are included in the first relationship set. When the quantity of transmission layers is determined, the mapping relationship message sent by the UE to the network device may indicate one of at least two mapping relationships in the multiple mapping relationships between the codeword and the transmission layers when the quantity of transmission layers is determined. A manner of the indication may be sending an index, or the indication is performed in another manner, which is not limited in the present invention. Further, the first relationship set, the second relationship set, and the third relationship set may be stored in, for example, the UE, or may be obtained from another device.

In an embodiment of the present invention, a value of a CQI is determined according to the determined mapping relationship, and the channel quality indicator CQI is fed back to the network device. At least one of a quantity or the value of the CQI is obtained according to the determined at least one mapping relationship. It should be understood that manners for calculating the CQI are different because mapping relationships are different. Specifically, after a signal-to-noise ratio of a corresponding layer is calculated by using an equivalent channel coefficient $\hat{h}_{\mathit{eff}}(x)$ of the layer, an SNR of a codeword is determined according to the signal-to-noise ratio of the corresponding layer (transmission layer). Further, a value of a CQI is obtained according to quantization of the SNR of the codeword.

In an embodiment of the present invention, the third relationship is a mapping relationship between the DM-RS port and the CSI-RS port.

In an embodiment, the mapping relationships included in the first relationship set, the second relationship set, and the third relationship set involved in the embodiments of the present invention may include only one mapping relationship in some cases. In addition, a DM-RS port in the second relationship set and a CSI-RS port in the third relationship set may be other pilot ports.

When UE measures the first reference signal and determines channel quality, a codeword to CSI-RS mapping relationship is fixed. In an implementation manner shown in this embodiment of the present invention, the UE obtains a difference between codeword to CSI-RS mapping relationships by using a channel quality measurement model, may calculate an optimized mapping relationship by means of measurement, and determines at least one mapping relationship from these mapping relationships, to adjust a codeword to CSI-RS mapping relationship of a channel, thereby improving system flexibility and increasing channel resource utilization.

The following specifically describes, by using specific examples, the foregoing manner in which the UE obtains the measurement result by means of the measurement and determines the third relationship.

When the first reference signal is a reference signal corresponding to configuration information of at least two CSI-RSs, the measuring the first reference signal to obtain a measurement result includes: determining, by the UE, the first channel matrix by measuring the first CSI-RS:

$$H_1 = \begin{bmatrix} h_{00} & h_{01} & \cdots & h_{03} \\ h_{10} & h_{11} & \cdots & h_{13} \\ \vdots & \vdots & \cdots & \vdots \\ h_{70} & h_{71} & \cdots & h_{73} \end{bmatrix}$$

The UE determines the second channel matrix by measuring the first CSI-RS:

$$H_2 = \begin{bmatrix} h_{04} & h_{05} & \cdots & h_{07} \\ h_{14} & h_{15} & \cdots & h_{17} \\ \vdots & \vdots & \cdots & \vdots \\ h_{74} & h_{75} & \cdots & h_{77} \end{bmatrix}$$

The UE determines the quantity of layers. In an embodiment, the UE determines the quantity of layers according to the first channel matrix and the second channel matrix. Specifically, $H_1$ and $H_2$ may be combined into the matrix H:

$$H = \begin{bmatrix} h_{00} & h_{01} & \cdots & h_{07} \\ h_{10} & h_{11} & \cdots & h_{17} \\ \vdots & \vdots & \cdots & \vdots \\ h_{70} & h_{71} & \cdots & h_{77} \end{bmatrix}$$

Then, the quantity of layers is determined according to H.

The UE determines mapping relationships between the layers and a CSI-RS configuration. The determining process may be traversing mapping relationships between all the layers and different CSI-RSs. The determining process may be finding a mapping relationship that is between a layer and a CSI-RS configuration and that enables a throughput to be optimal or an SNR to be maximum.

For example, the quantity of layers that is determined by the UE is 5, and the five layers are a layer 0, a layer 1, a layer 2, a layer 3, and a layer 4. Respective mapping relationships between each layer and different CSI-RS configurations exist. The UE traverses the mapping relationships between all the layers and the different CSI-RSs to find a mapping relationship that is between each layer and a CSI-RS configuration and that enables a throughput to be optimal or an SNR to be maximum. For example, the layer 0 and the layer 1 are mapped to a first CSI-RS configuration, and the layer 2, the layer 3, and the layer 4 are mapped to a second CSI-RS configuration. The UE feeds back the optimal mapping relationship between the layer and the different CSI-RS configurations to the base station in step 104. The mapping relationship may be a correspondence. For example, if the UE determines that the layer 0 in the first CSI-RS configuration is superior to that in the second CSI-RS configuration, the UE determines that the layer 0 is mapped to the first CSI-RS configuration. Cases for the layer 1 to the layer 4 are similar. Alternatively, a limited quantity of different configuration combinations of all layers may be traversed to determine an optimal case, and determine an optimal configuration corresponding to each layer. For example, a layer 0 ($i_1$), a layer 1 ($i_2$), a layer 2 ($i_3$), a layer 3 ($i_4$), and a layer 4 ($i_5$) are configurations of five layers. When $i_1=1$, a first configuration is selected for the $0^{th}$ layer. When $i_1=2$, a second configuration is selected for the $0^{th}$ layer. Cases for $i_2$ to $i_5$ are similar. In this way, there are $2^5$ configuration combinations in total. A system may traverse the $2^5$ configurations and determine an optimal configuration manner. The configuration manner may be a CSI-RS configuration corresponding to each layer. To improve efficiency, a traversal range may be a subset of the foregoing $2^5$ configurations. It should be understood that the configuration manner and value selection are merely an example.

The correspondence between the layer and the CSI-RS configuration is the third mapping relationship.

After the UE determines the third mapping relationship, the UE further feeds back PMI (precoding matrix indication) precoding matrix indication information when a CSI-RS configuration is selected. For example, the layer 0 and the layer 1 are mapped to the first CSI-RS configuration; if four antenna ports exist, a precoding matrix W1 is determined according to configurations of the layer 0 and the layer 1. W1 is a 4×2 matrix. A quantity of rows is corresponding to the quantity of antenna ports, and a quantity of columns is a quantity of layers of the first CSI-RS configuration. There are totally two layers: the layer 0 and the layer 1, and W1 has four rows and two columns. The layer 2, the layer 3, and the layer 4 are mapped to the second CSI-RS configuration. If four antenna ports exist, a precoding matrix W2 is determined according to configurations of the layer 2, the layer 3, and the layer 4. W2 is a 4×3 matrix, that is, W2 has four rows and three columns.

Alternatively, the third relationship may be a correspondence that is between the transmission layers and a CSI process and that is fed back by the UE, or correspondences that are between the transmission layers and different CSI-RS ports and that are fed back by the UE. In LTE, a CSI process is defined as configuring, by the base station, a non-zero power CSI-RS and an interference measurement reference signal IMRS (interference measurement resource signal). The UE feeds back CSI (channel state information) by using the non-zero power CSI-RS and the IMRS. The base station may configure multiple CSI processes for the UE. Each CSI process has an index of the CSI process. The UE feeds back an optimal correspondence between the transmission layers and different CSI processes by using the CSI processes.

Alternatively, a CSI-RS configuration includes multiple CSI-RS ports. The third relationship may be correspondences that are between different transmission layers and different CSI-RS ports and that are fed back by the UE by measuring a channel The UE may further receive indication information sent by the network device. The UE feeds back a corresponding precoding matrix indication PMI and the CQI or feeds back only the third relationship and the CQI according to the feedback information.

It should be understood that the CSI-RS configuration information fed back in the foregoing feedback process may be one or more indications used to instruct the eNB to determine corresponding configuration information according to the indication. The port to CSI-RS mapping relationship may also be selection information. For example, when the quantity of layers is 5, when the layer 0 is corresponding to the first CSI-RS configuration, 0 is fed back; when the layer 0 is corresponding to the second SCI-RS configuration, 1 is fed back. Cases for the layer 1 to the layer 5 are similar. Alternatively, the port to CSI-RS mapping relationship may be an all-layer joint indication. That is, a selection matrix or a selection indication is fed back to indicate CSI-RS configuration information corresponding to all the layers.

Figure 2:
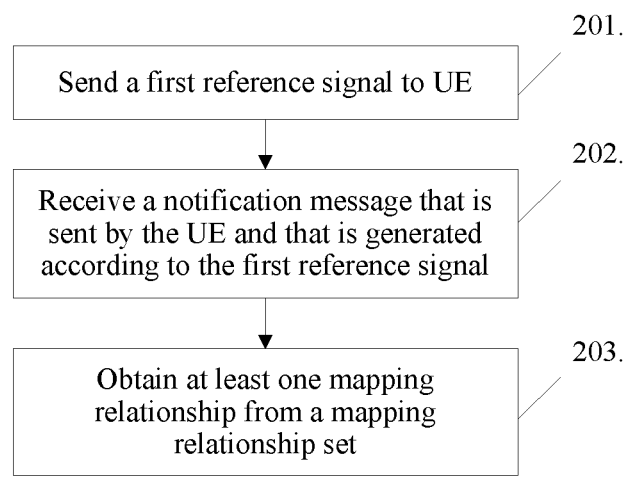
FIG. 2 is a flowchart of another embodiment of a data transmission method according to the present invention.

FIG. 2 shows an embodiment of a data transmission method in the present invention. The method is a method in which a network side device transmits data. The method may be applied to a network including a first network side device and specifically includes the following steps:

Step 201: A network device sends a first reference signal to UE. Optionally, the network device is an evolved NodeB eNB.

Step 202: The network device receives a notification message that is sent by the UE and that is generated according to the first reference signal, where the notification message is used to indicate at least one mapping relationship in a mapping relationship set.

The at least one mapping relationship is determined by the UE from the mapping relationship set according to the first reference signal. The mapping relationship set includes at least one of a first relationship set, a second relationship set, or a third relationship set. The first relationship set includes multiple mapping relationships between a codeword and transmission layers when a quantity of transmission layers is determined. The second relationship set includes multiple mapping relationships between the transmission layers and a demodulation reference signal DM-RS port. The third relationship set includes multiple mapping relationships between the transmission layers and a channel state information-reference signal CSI-RS port.

It should be understood that, in the present invention, the mapping relationship set may include multiple mapping relationships in the first relationship set, the second relationship set, and the third relationship set. For example, the one mapping relationship may include a mapping relationship in the first relationship set, that is, a mapping relationship of mapping a codeword to a transmission layer of the codeword when the quantity of transmission layers is determined, and further includes a mapping relationship in the third relationship set, that is, a mapping relationship between a transmission layer and a corresponding CSI-RS port. The UE determines a mapping relationship between a codeword and a layer of the codeword from the first relationship set, and the UE further determines a mapping relationship between a layer and a corresponding CSI-RS port from the third relationship set. A determining sequence of the first relationship set, the second relationship set, and the third relationship set is not limited in the present invention.

In an embodiment of the present invention, the third relationship is a mapping relationship between the DM-RS port and the CSI-RS port.

In another embodiment of the present invention, the first reference signal is a CSI-RS signal. Further, the first reference signal includes at least two reference signals corresponding to different CSI-RS configuration information, and the reference signals corresponding to the different CSI-RS configuration information are corresponding to different ports.

Optionally, after the first reference signal is sent to the UE, a channel quality indicator CQI sent by the UE is received, and at least one of a quantity of the CQIs or a value of the CQI is obtained according to the determined at least one mapping relationship.

In an embodiment of the present invention, when the quantity of transmission layers is greater than or equal to 2, the first relationship set includes at least a first mapping relationship and a second mapping relationship; in the first mapping relationship, a first codeword is mapped to a first transmission layer set, and a second codeword is mapped to a second transmission layer set; in the second mapping relationship, the first codeword is mapped to a third transmission layer set, and the second codeword is mapped to a fourth transmission layer set.

Each transmission layer set includes at least one transmission layer, the first transmission layer is different from the third transmission layer set, and the second transmission layer set is different from the fourth transmission layer set.

In an embodiment of the present invention, when the quantity of transmission layers is greater than or equal to 2, at least one first relationship in at least one mapping relationship in the first relationship set meets a first condition, where the first condition is:

in mapping relationships between k codewords and respective layers, if the $i^{th}$ codeword and the $j^{th}$ codeword meet i>j, m<n is met, where each codeword is mapped to at least one layer, a layer with a minimum sequence number in the layer corresponding to the $i^{th}$ codeword is the $m^{th}$ layer, and a layer with a maximum sequence number in the layer corresponding to the $j^{th}$ codeword is the $n^{th}$ layer. For a specific example, reference may be made to step 103 in the embodiment shown in FIG. 1, and details are not described herein again.

It should be understood that the present invention provides a case of the first relationship set that may exist in cases in which rank indications are 2 to 8. When the quantity of transmission layers is determined, the mapping relationship message received by the network device may indicate one of at least two mapping relationships in the multiple mapping relationships between the codeword and the transmission layers when the quantity of transmission layers is determined. A manner of the indication may be sending an index, or the indication is performed in another manner, which is not limited in the present invention. Further, the first relationship set, the second relationship set, and the third relationship set may be stored in, for example, the network device, or may be obtained from another device.

Step 203: The network device obtains the at least one mapping relationship from the mapping relationship set according to the mapping relationship message.

In this embodiment, a network device sends the first reference signal to UE, so that the UE obtains a difference between codeword to CSI-RS mapping relationships by using a channel quality measurement model and may calculate an optimized mapping relationship by means of measurement. The network device receives a mapping relationship message sent by the UE, determines a codeword to CSI-RS mapping relationship according to an indication of the mapping relationship message, and transmits data according to the mapping relationship, thereby increasing channel resource utilization by means of flexible configuration.

Corresponding to the embodiment shown in FIG. 1, when the first reference signal includes at least two reference signals corresponding to different CSI-RS configuration information, step 202 of receiving, by the network device, a notification message that is sent by the UE and that is generated according to the first reference signal, where the notification message is used to indicate at least one mapping relationship in a mapping relationship set may include the following:

The third relationship may be various corresponding third relationships in the embodiment shown in FIG. 1.

Figure 3:
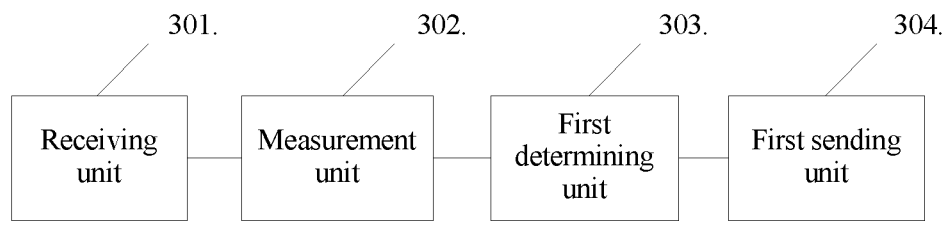
FIG. 3 is a schematic structural diagram of an embodiment of user equipment according to the present invention.

FIG. 3 shows an apparatus embodiment of user equipment UE in the present invention. The UE apparatus is configured to transmit data, and the apparatus may be applied to a network including the UE. The UE selects at least one mapping relationship set from at least one mapping relationship set, then selects a specific mapping relationship from the selected mapping relationship set, and transmits data according to the mapping relationship. The UE specifically includes a receiving unit 301, a measurement unit 302, a first determining unit 303, and a first sending unit 304.

The receiving unit 301 is configured to receive a first reference signal sent by a network device.

The measurement unit 302 is configured to measure the first reference signal to obtain a measurement result. The first determining unit 303 is configured to determine at least one mapping relationship from a mapping relationship set according to the measurement result, where the mapping relationship set includes at least one of a first relationship set, a second relationship set, or a third relationship set, the first relationship set includes multiple mapping relationships between a codeword and transmission layers when a quantity of transmission layers is determined, the second relationship set includes multiple mapping relationships between the transmission layers and a demodulation reference signal DM-RS port, and the third relationship set includes multiple mapping relationships between the transmission layers and a channel state information-reference signal CSI-RS port.

It should be understood that the mapping relationship set may include multiple mapping relationships in the first relationship set, the second relationship set, and the third relationship set. For example, the mapping relationship set may include a mapping relationship of mapping a codeword to a transmission layer of the codeword in the first relationship set when the quantity of transmission layers is determined, and further includes multiple mapping relationships between the transmission layers and a channel state information-reference signal CSI-RS port in the third relationship set. The UE determines a mapping relationship of mapping a codeword to a transmission layer of the codeword from the first relationship set when the quantity of transmission layers is determined, and the UE determines multiple mapping relationships between the transmission layers and a channel state information-reference signal CSI-RS port from the third relationship set. A determining sequence of the first relationship set, the second relationship set, and the third relationship set is not limited in the present invention.

Figure 4:
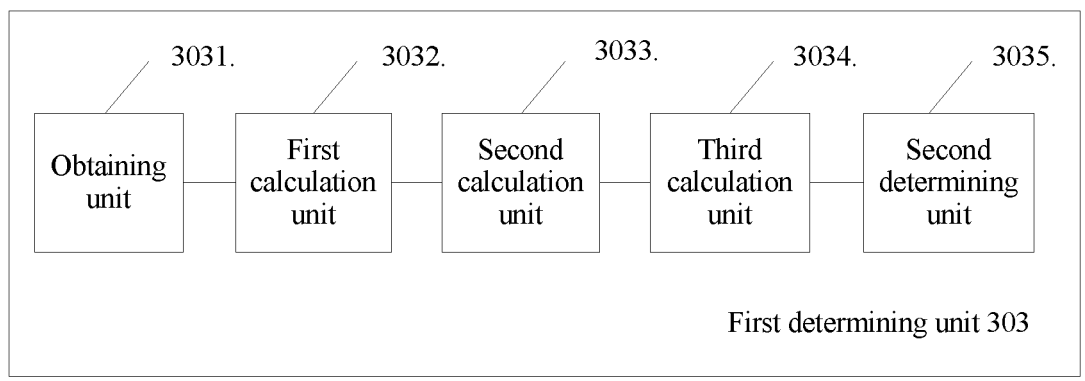
FIG. 4 is a schematic structural diagram of an embodiment of another user equipment according to the present invention.

In addition, there are many manners for determining a mapping relationship from the mapping relationship set. When the mapping relationship set includes the first relationship set, FIG. 4 shows an embodiment of the first determining unit 303 in the present invention, and the first determining unit may include:

an obtaining unit 3031, configured to obtain a channel coefficient according to the result of measuring the first reference signal by the measurement unit;

a first calculation unit 3032, configured to calculate an equivalent channel coefficient of a channel according to the channel coefficient and a codebook;

a second calculation unit 3033, configured to calculate a signal-to-noise ratio of each layer according to the equivalent channel coefficient of the channel;

a third calculation unit 3034, configured to calculate a channel capacity of each codeword-to-layer mapping relationship in the first relationship set according to the signal-to-noise ratio of each layer; and a second determining unit 3035, configured to determine a codeword-to-layer mapping relationship with a maximum channel capacity.

Specifically, the first reference signal may be a CSI-RS signal. The measurement unit 302 measures the CSI-RS to obtain a transmission matrix of the channel. Optionally, the first reference signal includes at least two reference signals corresponding to different CSI-RS configuration information, and the reference signals corresponding to the different CSI-RS configuration information are corresponding to different ports. For example, when a quantity of ports is 8 and a quantity of layers is 5, a first CSI-RS signal is corresponding to a port 0 to a port 3, and a second CSI-RS signal is corresponding to a port 4 to a port 7.

The obtaining unit 3031 obtains the channel coefficient according to the measurement result. The channel coefficient may be indicated in a form of a matrix. When the first reference signal is corresponding to configuration information of the two CSI-RSs, the obtaining unit obtains two channel matrices.

A channel matrix is obtained according to the first CSI-RS:

$$H_1 = \begin{bmatrix} h_{00} & h_{01} & \cdots & h_{03} \\ h_{10} & h_{11} & \cdots & h_{13} \\ \vdots & \vdots & \cdots & \vdots \\ h_{70} & h_{71} & \cdots & h_{73} \end{bmatrix}$$

A channel matrix is obtained according to the second CSI-RS:

$$H_2 = \begin{bmatrix} h_{04} & h_{05} & \cdots & h_{07} \\ h_{14} & h_{15} & \cdots & h_{17} \\ \vdots & \vdots & \cdots & \vdots \\ h_{74} & h_{75} & \cdots & h_{77} \end{bmatrix}$$

A finally combined channel matrix is:

$$H = \begin{bmatrix} h_{00} & h_{01} & \cdots & h_{07} \\ h_{10} & h_{11} & \cdots & h_{17} \\ \vdots & \vdots & \cdots & \vdots \\ h_{70} & h_{71} & \cdots & h_{77} \end{bmatrix}$$

The first calculation unit 3032 is configured to calculate the equivalent channel coefficient of the channel according to the channel coefficient and the codebook. If the determined codebook is $W_{8\times5}$, the equivalent channel coefficient (a matrix) is $H_{\mathit{eff}} = HW_{8\times5}$, and $$H_{eff} = \begin{bmatrix} h_{00}^{eff} & h_{01}^{eff} & \cdots & h_{04}^{eff} \\ h_{10}^{eff} & h_{11}^{eff} & \cdots & h_{14}^{eff} \\ \vdots & \vdots & \cdots & \vdots \\ h_{70}^{eff} & h_{71}^{eff} & \cdots & h_{74}^{eff} \end{bmatrix} = \begin{bmatrix} \hat{h}_{eff}(0) & \hat{h}_{eff}(1) & \hat{h}_{eff}(2) & \hat{h}_{eff}(3) & \hat{h}_{eff}(4) \end{bmatrix},$$

where $\hat{h}_{eff}(x)$ indicates an equivalent channel coefficient of the $x^{th}$ layer. It should be understood that, for convenience, a form of a matrix is used for description in the present invention. Various calculation processes or methods in the present invention may be implemented in other forms, which may be but are not limited to sequence calculation or array calculation.

The third calculation unit 3034 is configured to calculate the channel capacity of each codeword-to-layer mapping relationship in the first relationship set according to the signal-to-noise ratio of each layer.

When the quantity of transmission layers is determined, calculating the channel capacity of each codeword-to-transmission-layer mapping relationship in the first relationship set may be implemented by using multiple methods. In an embodiment of the present invention, a signal-to-noise ratio of a corresponding layer is calculated by using an equivalent channel coefficient $\hat{h}_{eff}(x)$ of the layer. Optionally, a minimum mean square error MMSE (Minimum Mean Square Error) algorithm may be used for the calculation.

The channel capacity of each codeword-to-transmission-layer mapping relationship in the first relationship set is calculated according to the signal-to-noise ratio of each layer. Optionally, a capacity formula may be used for the calculation. For example, a mapping relationship in the first relationship set is:

$x^{(3)}(i)=d^{(0)}(2i)$
$x^{(4)}(i)=d^{(0)}(2i+1))$
$x^{(0)}(i)=d^{(1)}(3i)$
$x^{(1)}(i)=d^{(1)}(3i+1)$
$x^{(2)}(i)=d^{(1)}(3i+2)$

A corresponding codeword 0 is mapped to the third and fourth layers, and a signal-to-noise ratio of the corresponding codeword 0 is SNR_CW(0). A corresponding codeword 1 is mapped to the $0^{th}$, first, and second layers, and a signal-to-noise ratio of the corresponding codeword 1 is SNR_CW(0). A total capacity C that is of the mapping relationships and that is obtained by using the capacity formula is:

C=101 g(1+SNR_CW(0))(1+SNR_CW(1))

Each codeword-to-layer mapping relationship in the first relationship set is calculated according to the method.

The second determining unit 3035 is configured to determine the codeword-to-layer mapping relationship with the maximum channel capacity. Optionally, the codeword-to-layer mapping relationship corresponding to the maximum capacity is selected.

It should be understood that, when the quantity of transmission layers is determined, each codeword-to-transmission-layer mapping relationship described above is merely an example. In this process, different implementation manners may exist. For example, the mapping relationship is determined by measuring a throughput and by measuring a channel capacity and another parameter, or determined comprehensively by using multiple parameters. The present invention sets no limitation to but requires protection of all methods that meet selection of a mapping relationship from the first relationship set. In addition, there may be logical combination, splitting, and modification to the apparatuses and units in this embodiment. For example, the first determining unit 303 may be a processor, and subunits included in the first determining unit 303 may be different or same adders and multipliers or other operation modules or processing modules of the processor.

In an embodiment, when the quantity of transmission layers is greater than or equal to 2, at least one first relationship in at least one mapping relationship in the first relationship set meets a first condition, where the first condition is:

in mapping relationships between k codewords and respective layers, if the $i^{th}$ codeword and the $j^{th}$ codeword meet i>j, m<n is met, where each codeword is mapped to at least one layer, a layer with a minimum sequence number in the layer corresponding to the $i^{th}$ codeword is the $m^{th}$ layer, and a layer with a maximum sequence number in the layer corresponding to the $j^{th}$ codeword is the $n^{th}$ layer.

For example, the following first relationship mapping exists:

$x^{(0)}(i)=d^{(0)}(3i)$
$x^{(2)}(i)=d^{(0)}(3i+1)$
$x^{(4)}(i)=d^{(0)}(3i+2)$
$x^{(1)}(i)=d^{(0)}(2i)$
$x^{(3)}(i)=d^{(1)}(2i+1)$ where $d^{(k)}(q)$ indicates the $q^{th}$ value of the $k^{th}$ codeword, $x^{(m)}(n)=d^{(k)}(q)$ indicates that the $q^{th}$ value of the $k^{th}$ codeword is mapped to the $m^{th}$ layer, and p is a quantity of layers.

A quantity of codewords is k=2, that is, there are two codewords: the $0^{th}$ codeword and the first codeword 1. In this example, i=1, and j=0. The layer with the minimum sequence number in the layer corresponding to the $i^{th}$ codeword is the $m^{th}$ layer, that is, a minimum sequence number value m of a layer corresponding to the codeword 1 is 1; the layer with the maximum sequence number in the layer corresponding to the $j^{th}$ codeword is the $n^{th}$ layer, that is, a maximum sequence number value n of a layer corresponding to the codeword 0 is 4, where m<n is met.

In an embodiment of the present invention, for the first relationship set, there are some possible first relationship sets provided in the first relationship set embodiment shown in FIG. 1, and details are not described herein again.

The first sending unit 304 is configured to send a notification message to the network device, where the notification message is used to indicate the mapping relationship determined by the first determining unit.

In an embodiment of the present invention, a channel quality indicator CQI is fed back to the network device, and at least one of a quantity of the CQIs or a value of the CQI is obtained according to the determined at least one mapping relationship. In an embodiment of the present invention, the third relationship is a mapping relationship between the DM-RS port and the CSI-RS port.

It should be understood that the present invention sets no limitation to integration, splitting, and logical modification to the modules or the units in the embodiments. For example, the first calculation unit, the second calculation unit, and the third calculation unit may be combined into one calculation unit.

When UE measures a first reference signal and determines channel quality, a codeword to CSI-RS mapping relationship is fixed. According to the apparatus shown in this embodiment of the present invention, the UE obtains a difference between layer to CSI-RS mapping relationships by using a channel quality measurement model, may calculate an optimized mapping relationship by means of measurement, and determines at least one mapping relationship from these mapping relationships, to adjust a codeword to CSI-RS mapping relationship of a channel, thereby improving system flexibility and increasing channel resource utilization.

It should be understood that the UE apparatus shown in FIG. 4 can also implement the embodiment shown in FIG. 1.

Figure 5:
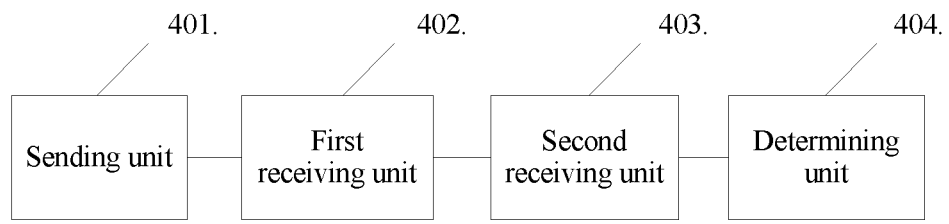
FIG. 5 is a schematic structural diagram of an embodiment of a network device according to the present invention.

FIG. 5 shows an apparatus embodiment of a network device for implementing the present invention in the present invention. The apparatus is a network device, and the apparatus may be applied to a network including the network device. The apparatus is configured to send a first reference signal and receive a message indicating a mapping relationship. The apparatus specifically includes a sending unit 401, a first receiving unit 402, and a determining unit 404.

The sending unit 401 is configured to send a reference signal to user equipment UE.

Optionally, the network device is an evolved NodeB eNB.

The first receiving unit 402 is configured to receive a mapping relationship message that is sent by the UE and that is generated according to the first reference signal, where the notification message is used to indicate at least one mapping relationship in a mapping relationship set.

The at least one mapping relationship is determined by the UE from the mapping relationship set according to the first reference signal. The mapping relationship set includes at least one of a first relationship set, a second relationship set, or a third relationship set. The first relationship set includes multiple mapping relationships between a codeword and transmission layers when a quantity of transmission layers is determined. The second relationship set includes multiple mapping relationships between the transmission layers and a demodulation reference signal DM-RS port. The third relationship set includes multiple mapping relationships between the transmission layers and a channel state information-reference signal CSI-RS port.

It should be understood that, in the present invention, the mapping relationship set may include multiple mapping relationships in the first relationship set, the second relationship set, and the third relationship set. For example, the one mapping relationship may include a mapping relationship in the first relationship set, and further includes a mapping relationship in the third relationship set. The UE determines multiple mapping relationships between a codeword and the transmission layers from the first relationship set when the quantity of transmission layers is determined, and the UE further determines multiple mapping relationships between the transmission layers and a channel state information-reference signal CSI-RS port from the third relationship set. A determining sequence of the first relationship set, the second relationship set, and the third relationship set is not limited in the present invention.

In an embodiment of the present invention, the third relationship further includes a mapping relationship between the corresponding DM-RS port and the corresponding CSI-RS port.

In another embodiment of the present invention, the first reference signal is a CSI-RS signal. Further, the first reference signal includes at least two reference signals corresponding to different CSI-RS configuration information, and the reference signals corresponding to the different CSI-RS configuration information are corresponding to different ports.

Optionally, after the reference signal is sent to the UE, the apparatus further includes:

a second receiving unit 403, configured to receive a channel quality indicator CQI sent by the UE. At least one of a quantity of the CQIs or a value of the CQI is obtained according to the determined at least one mapping relationship.

In an embodiment of the present invention, when the quantity of transmission layers is greater than or equal to 2, the first relationship set includes at least a first mapping relationship and a second mapping relationship; in the first mapping relationship, a first codeword is mapped to a first transmission layer set, and a second codeword is mapped to a second transmission layer set; in the second mapping relationship, the first codeword is mapped to a third transmission layer set, and the second codeword is mapped to a fourth transmission layer set.

Each transmission layer set includes at least one transmission layer, the first transmission layer is different from the third transmission layer set, and the second transmission layer set is different from the fourth transmission layer set.

In an embodiment of the present invention, when a RANK value is greater than or equal to 2, at least one first relationship in at least one mapping relationship in the first relationship set meets a first condition, where the first condition is:

in mapping relationships between k codewords and respective layers, if the $i^{th}$ codeword and the $j^{th}$ codeword meet i>j, m<n is met, where each codeword is mapped to at least one layer, a layer with a minimum sequence number in the layer corresponding to the $i^{th}$ codeword is the $m^{th}$ layer, and a layer with a maximum sequence number in the layer corresponding to the $j^{th}$ codeword is the $n^{th}$ layer.

For a specific example, reference may be made to step 103 in the embodiment shown in FIG. 1, and details are not described herein again.

In an embodiment of the present invention, for the first relationship set, there are some possible first relationship sets provided in the first relationship set embodiment shown in FIG. 1, and details are not described herein again.

When the quantity of transmission layers is determined, the mapping relationship message received by the network device may indicate one of at least two first mapping relationships. A manner of the indication may be sending an index, or the indication is performed in another manner, which is not limited in the present invention. Further, the first relationship set, the second relationship set, and the third relationship set may be stored in, for example, the network device, or may be obtained from another device.

The determining unit 404 is configured to obtain the at least one mapping relationship from the mapping relationship set according to the mapping relationship message.

It should be understood that the present invention sets no limitation to integration, splitting, and logical sequence modification to the units or the modules in the embodiments. For example, the first receiving unit 402 and the second receiving unit 403 may be combined into one receiving unit.

In this embodiment, a sending unit in a network device sends a first reference signal to UE, so that the UE obtains a difference between codeword to CSI-RS mapping relationships by using a channel quality measurement model and may calculate an optimized mapping relationship by means of measurement. A receiving unit receives a mapping relationship message sent by the UE, determines a codeword to CSI-RS mapping relationship according to an indication of the mapping relationship message, and transmits data according to the mapping relationship, thereby increasing channel resource utilization by means of flexible configuration.

Figure 6:
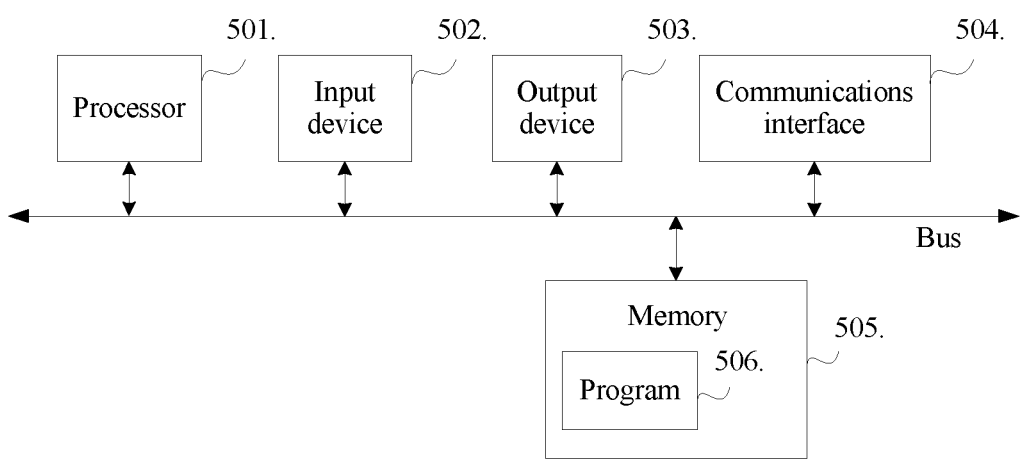
FIG. 6 shows a schematic diagram of a computer system implementing data transmission according to the present invention.

FIG. 6 shows an embodiment of another computer system in the present invention.

The computer system may be specifically a processor-based computer, for example, a general purpose personal computer (PC) or a portable device such as a tablet computer or a smartphone.

More specifically, the foregoing computer system may include a bus, a processor 501, an input device 502, an output device 503, a communications interface 504, and a memory 505. The processor 501, the input device 502, the output device 503, the communications interface 504, and the memory 505 are connected to each other by using the bus.

The bus may include a path for information transfer between components in the computer system.

The processor 501 may be a general purpose processor, for example, a general purpose central processing unit (CPU), a network processor (Network Processor, NP for short), or a microprocessor, or may be an application-specific integrated circuit (application-specific integrated circuit, ASIC), or one or more integrated circuits configured to control execution of a program in the solutions in the present invention, or may be a digital signal processor (DSP), an application-specific integrated circuit (ASIC), a field programmable gate array (FPGA) or another programmable logic device, a discrete gate or transistor logic device, or a discrete hardware component.

The memory 505 stores a program for executing the technical solutions in the present invention and may further store an operating system and another application program. Specifically, the program may include program code, and the program code includes a computer operation instruction. More specifically, the memory 505 may be a read-only memory (read-only memory, ROM), another type of static storage device that can store static information and a static instruction, a random access memory (random access memory, RAM), another type of dynamic storage device that can store information and an instruction, a magnetic disk storage, or the like.

The input device 502 may include an apparatus, for example, a keyboard, a mouse, a camera, a scanner, a light pen, a voice input apparatus, or a touchscreen, that receives data and information that are input by a user.

The output device 503 may include an apparatus, for example, a display screen, a printer, or a speaker, that allows information to be output to a user.

The communications interface 504 may include an apparatus using any transceiver or the like, to communicate with another device or a communications network, for example, the Ethernet, a radio access network (RAN), or a wireless local area network (WLAN).

The processor 501 executes the program stored in the memory 505 and is configured to implement a signal transmission method provided in any embodiment of the present invention and implement any apparatus in this embodiment.

It should be understood that, in all embodiments of the present invention, the mapping relationship and the one mapping relationship may be a single mapping relationship between ports, for example, a codeword-to-layer mapping relationship, multiple mapping relationships between layers and a DM-RS port, or a mapping relationship between a DM-RS port and a CSI-RS, or may be one mapping relationship that includes multiple mapping relationships from a perspective of a system. For example, according to the method or the apparatus in the present invention, if a codeword to CSI-RS mapping relationship is determined, the one mapping relationship may include a codeword-to-layer mapping relationship, multiple mapping relationships between layers and a DM-RS port, and a mapping relationship between the DM-RS port and a CSI-RS port, or may be an independent codeword to CSI-RS mapping relationship.

The following specifically describes an implementation method in the present invention by using an embodiment. Specifically, this embodiment may be used as a method for determining the second relationship. For convenience, the present invention provides method implementation manners from perspectives of UE and an eNB.

1. Implementation manner on a UE side:

The UE sends an SRS reference signal, where the SRS reference signal is used by the eNB to measure a channel.

The UE receives a signal W·x obtained by performing precoding processing.

The UE obtains a DM-RS reference signal x.

The UE obtains, according to x and W·x, an equivalent channel $H_{Rx \times Tx}W$ of ports corresponding to n antennas corresponding to the DM-RS reference signal x.

The UE determines, according to $H_{Rx \times Tx}W$, a mapping relationship between the m layers and n corresponding DM-RS demodulation pilot ports.

It should be understood that the foregoing method may be implemented inside the UE apparatus, and the sending an SRS reference signal may be implemented by a sending unit.

The receiving, by the UE, a signal W·x obtained by performing precoding processing may be implemented by a receiving unit.

The obtaining, by the UE according to x and W·x, an equivalent channel $H_{Rx \times Tx}W$ of ports corresponding to n antennas corresponding to the DM-RS reference signal x may be implemented by an obtaining unit.

The determining, by the UE according to $H_{Rx \times Tx}W$, a mapping relationship between the m layers and n corresponding DM-RS demodulation pilot ports may be implemented by a determining unit.

The obtaining, by the UE, a DM-RS reference signal x may be implemented by a memory or an obtaining unit according to a structure of the UE or a predetermined method.

2. Implementation manner on an eNB side:

The eNB receives the SRS signal.

The eNB measures the SRS reference signal and obtains, according to the measurement result, the signal W·x obtained by performing precoding processing on the DM-RS reference signal.

The eNB sends W·x to the UE.

It should be understood that the foregoing method may be implemented inside the eNB apparatus, and the receiving, by the eNB, the SRS signal may be implemented by a receiving unit.

The measuring, by the eNB, the SRS reference signal may be implemented by a measurement unit.

The obtaining, according to the measurement result, the signal W·x obtained by performing precoding processing on the DM-RS reference signal may be implemented by an obtaining unit.

The sending, by the eNB, W·x to the UE may be implemented by a sending unit.

Figure 7:
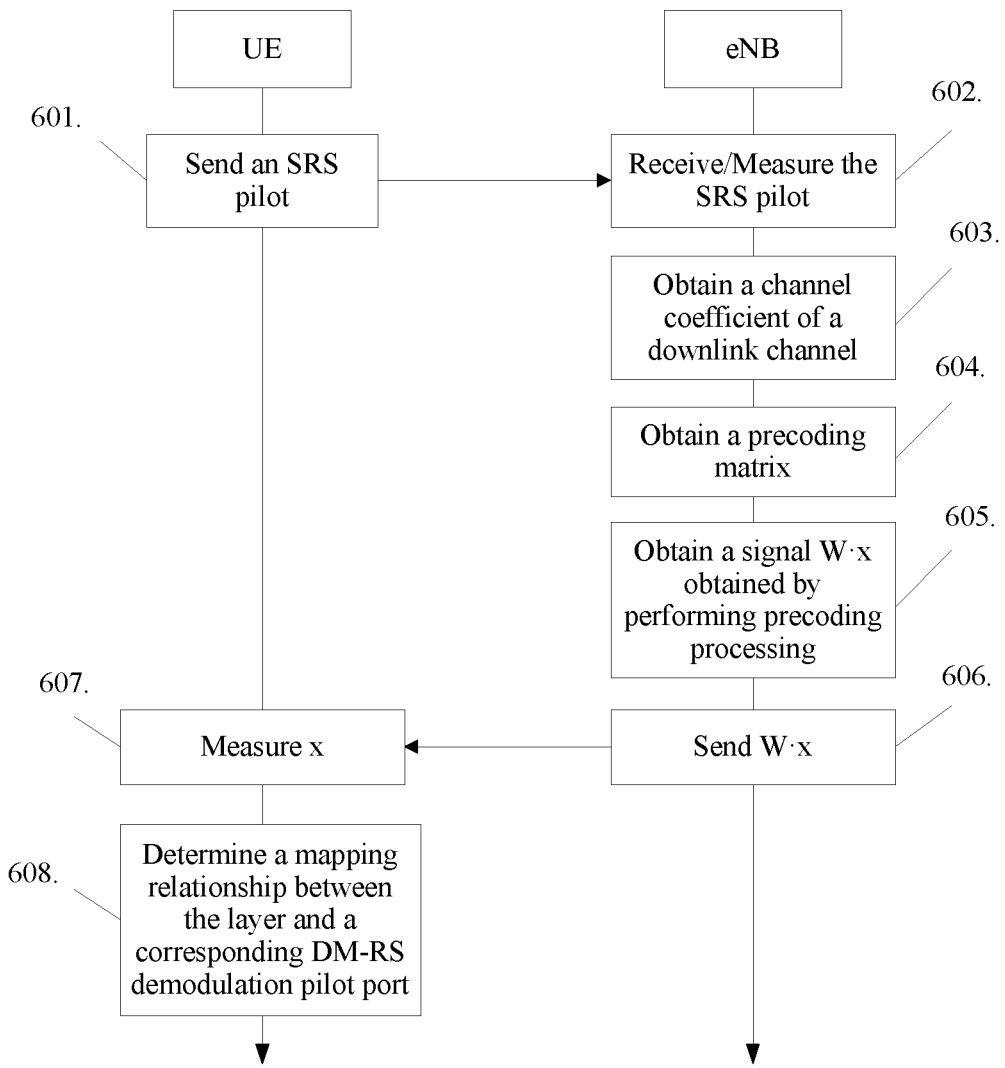
FIG. 7 shows a schematic systematic diagram of implementing data transmission according to the present invention.
Figure 8A:
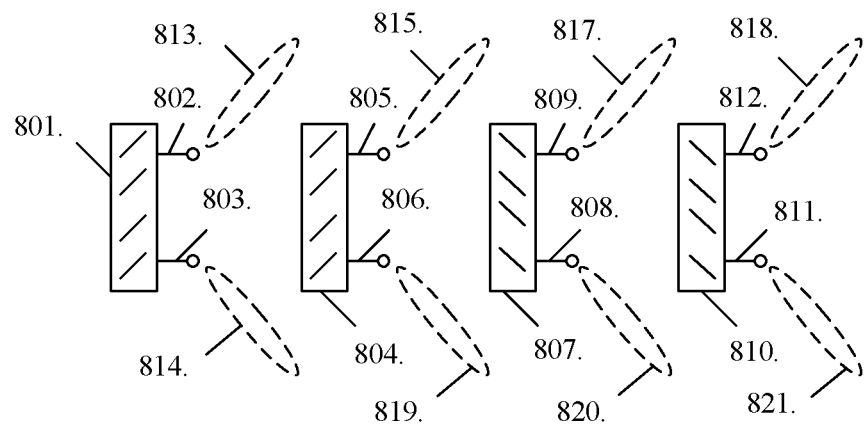
FIG. 8a is a schematic diagram of mapping antenna ports for transmitting a reference signal to four antenna elements.
Figure 8B:
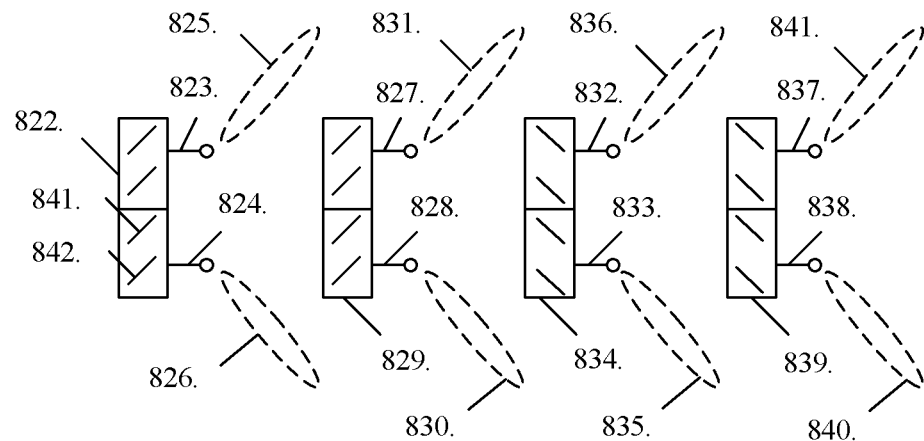
FIG. 8b is a schematic diagram of mapping antenna ports for transmitting a reference signal to two antenna elements.

FIG. 7 shows a system embodiment of the present invention. In the present invention, a network device is an eNB. Details are as follows:

Step 601: UE sends an SRS reference signal to the eNB.

Step 602: The eNB receives the SRS signal.

Step 603: The eNB measures the SRS reference signal and obtains an uplink channel coefficient $H_{Tx \times Rx}$ according to the measurement result, where Tx is a quantity of antenna ports corresponding to the base station, and Rx is a quantity of antenna ports corresponding to the UE.

It should be understood that the measurement process and the process of obtaining the uplink channel coefficient according to the measurement result in step 603 may be divided into two or more steps for execution, which is not limited in the present invention.

Step 604: The eNB obtains a channel coefficient $H_{Rx \times Tx}$ of a downlink channel according to channel reciprocity and the uplink channel coefficient $H_{Tx \times Rx}$.

Step 605: The eNB obtains a precoding matrix according to the downlink channel coefficient $H_{Rx \times Tx}$.

In an embodiment, the precoding matrix $W=[w_1\ w_2\ \ldots\ w_n]$ may be obtained in a singular value decomposition manner, where $w_z$ is the $z^{th}$ column in W, and a quantity of columns in W is n. It should be understood that the present invention sets no limitation to a manner for obtaining W according to $H_{Rx \times Tx}$.

Step 606: The eNB performs precoding processing on a DM-RS reference signal x according to W, to obtain a signal W·x obtained by performing precoding processing on the DM-RS reference signal.

Optionally, x may be pre-stored in the eNB and the UE; or optionally, x is stored in either the eNB or the UE and is notified to the peer end; or optionally, the eNB and/or the UE obtain or obtains x by receiving a message sent by another device.

Step 607: The eNB sends W·x to the UE, where a port quantity of the DM-RS reference signal x is n.

Step 608: The UE measures x sent by the eNB and obtains an equivalent channel of ports corresponding to n antennas corresponding to the DM-RS reference signal x. Specifically, a signal received by the UE is $y=H_{Rx \times Tx}Wx+n$, where n refers to noise, and the equivalent channel $H_{Rx \times Tx}$ of the ports corresponding to the n antennas may be obtained according to y and x.

It should be understood that the present invention sets no limitation to a manner for obtaining $H_{Rx \times Tx}W$ according to y and x, and the manner may be implemented by using a least square channel estimation algorithm or a minimum mean square error channel estimation algorithm.

Step 609: Determine, according to $H_{Rx \times Tx}W$, a mapping relationship between the m layers and n corresponding DM-RS demodulation pilot ports. Specifically, $H_{Rx \times Tx}W=[H_{\text{eff}\_1}\ H_{\text{eff}\_2}\ \ldots\ H_{\text{eff}\_n}]$, and $H_{\text{eff}\_v}$ refers to an equivalent channel corresponding to the $v^{th}$ port corresponding to the $v^{th}$ column in $H_{Rx \times Tx}W$. A signal-to-noise ratio corresponding to $H_{\text{eff}\_v}$ is obtained. The mapping relationship between the m layers and the n corresponding DM-RS demodulation pilot ports is determined according to the signal-to-noise ratio. In an embodiment, after the signal-to-noise ratio corresponding to $H_{\text{eff}\_v}$ is obtained, some ports with a high signal-to-noise ratio are selected from all $H_{\text{eff}\_v}$, and the layers are mapped to the some selected ports with the high signal-to-noise ratio. It should be understood that a value of m is less than or equal to a value of n.

With descriptions of the foregoing implementation manners, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in definition of a medium to which they belong. For example, a disk (Disk) and disc (disc) used in the present invention include a compact disc (CD), a laser disc, an optical disc, a digital versatile disc (DVD), a floppy disk, and a Blu-ray disc, where the disk generally copies data by a magnetic means, and the disc copies data optically by a laser means. The foregoing combination should also be included in the protection scope of the computer-readable medium.

In summary, what is described above is embodiments of the technical solutions in the present invention, but is not intended to limit the protection scope of the present invention. Any modification, equivalent replacement, or improvement made without departing from the spirit and principle of the present invention shall fall within the protection scope of the present invention.

What is claimed is:

1. A signal transmission method, comprising:
receiving a first reference signal sent by a network device;
measuring the first reference signal to obtain a measurement result;
determining at least one mapping relationship from a mapping relationship set according to the measurement result, wherein the mapping relationship set comprises mapping relationships between rank value and different channel state information-reference signal (CSI-RS) ports;
sending a notification message to the network device, wherein the notification message is used to indicate the determined at least one mapping relationship; and
sending a channel quality indicator (CQI) to the network device, wherein at least one of a quantity of the CQIs or a value of the CQI is obtained according to the determined at least one mapping relationship.

2. The method according to claim 1, wherein the first reference signal is a CSI-RS signal.

3. The method according to claim 2, wherein the first reference signal comprises at least two reference signals corresponding to different CSI-RS configuration information, and the reference signals corresponding to the different CSI-RS configuration information are corresponding to different ports; the at least two reference signals comprised in the first reference signal that are corresponding to the different CSI-RS configuration information are reference signals obtained through precoding weighting.

4. A signal transmission method, comprising:
sending, by a network device, a first reference signal to user equipment (UE);
receiving, by the network device, a notification message that is sent by the UE and that is generated according to the first reference signal, wherein the notification message indicates at least one mapping relationship in a mapping relationship set;
obtaining, by the network device, the at least one mapping relationship from the mapping relationship set according to the mapping relationship message, wherein:
the at least one mapping relationship is determined by the UE from the mapping relationship set according to the first reference signal, wherein the mapping relationship set comprises mapping relationships between rank value and different channel state information-reference signal (CSI-RS) ports; and
receiving a channel quality indicator (CQI) sent by the UE, wherein at least one of a quantity of the CQIs or a value of the CQI is obtained according to the determined at least one mapping relationship.

5. The method according to claim 4, wherein the first reference signal is a CSI-RS signal.

6. The method according to claim 5, wherein the first reference signal comprises at least two reference signals corresponding to different CSI-RS configuration information, and the reference signals corresponding to the different CSI-RS configuration information are corresponding to different ports; the at least two reference signals comprised in the first reference signal that are corresponding to the different CSI-RS configuration information are reference signals obtained through precoding weighting.

7. A user equipment (UE), comprising:
a receiver, configured to receive a first reference signal sent by a network device;
a processor, configured to measure the first reference signal to obtain a measurement result;
the processor further configured to determine at least one mapping relationship from a mapping relationship set according to the measurement result, wherein the mapping relationship set comprises mapping relationships between rank value and different channel state information-reference signal (CSI-RS) ports; and
a transmitter, configured to send a notification message to the network device, wherein the notification message indicates the at least one mapping relationship determined by the processor; and send a channel quality indicator (CQI) to the network device, wherein at least one of a quantity of the CQIs or a value of the CQI is obtained according to the determined at least one mapping relationship.

8. The user equipment according to claim 7, wherein the first reference signal is a CSI-RS signal.

9. The user equipment according to claim 8, wherein the first reference signal comprises at least two reference signals corresponding to different CSI-RS configuration information, and the reference signals corresponding to the different CSI-RS configuration information are corresponding to different ports; the at least two reference signals comprised in the first reference signal that are corresponding to the different CSI-RS configuration information are reference signals obtained through precoding weighting.

10. A network device, comprising:
a transmitter, configured to send a first reference signal to user equipment (UP;
a receiver, configured to receive a mapping relationship message that is sent by the UE and that is generated according to the first reference signal, wherein the notification message is used to indicate at least one mapping relationship in a mapping relationship set; and
a processor, configured to obtain the at least one mapping relationship from the mapping relationship set according to the mapping relationship message, wherein:
the at least one mapping relationship is determined by the UE from the mapping relationship set according to the first reference signal, wherein the mapping relationship set comprises mapping relationships between rank value and different channel state information-reference signal (CSI-RS) ports; and
the receiver is further configured to receive a channel quality indicator (CQI) sent by the UE, wherein at least one of a quantity of the CQIs or a value of the CQI is obtained according to the determined at least one mapping relationship.

11. The network device according to claim 10, wherein the first reference signal is a CSI-RS signal.

12. The network device according to claim 11, wherein the first reference signal comprises at least two reference signals corresponding to different CSI-RS configuration information, and the reference signals corresponding to the different CSI-RS configuration information are corresponding to different ports; the at least two reference signals comprised in the first reference signal that are corresponding to the different CSI-RS configuration information are reference signals obtained though precoding weighting.

13. A non-transitory computer readable medium having instructions stored thereon, the instructions executable by one or more processors for:
receiving a first reference signal sent by a network device;
measuring the first reference signal to obtain a measurement result;
determining at least one mapping relationship from a mapping relationship set according to the measurement result, wherein the mapping relationship set comprises mapping relationships between rank value and different channel state information-reference signal (CSI-RS) ports;
sending a notification message to the network device, wherein the notification message is used to indicate the determined at least one mapping relationship; and
sending a channel quality indicator (CQI) to the network device, wherein at least one of a quantity of the CQIs or a value of the CQI is obtained according to the determined at least one mapping relationship.

14. A non-transitory computer readable medium having instructions stored thereon, the instructions executable by one or more processors for:
sending a first reference signal to user equipment (UE);
receiving a notification message that is sent by the UE and that is generated according to the first reference signal, wherein the notification message indicates at least one mapping relationship in a mapping relationship set;
obtaining, by the network device, the at least one mapping relationship from the mapping relationship set according to the mapping relationship message, wherein:
the at least one mapping relationship is determined by the UE from the mapping relationship set according to the first reference signal, wherein the mapping relationship set comprises mapping relationships between rank value and different channel state information- reference signal (CSI-RS) ports; and
receiving a channel quality indicator (CQI) sent by the UE, wherein at least one of a quantity of CQIs or a value of the CQI is obtained according to the determined at least one mapping relationship.

* * * * *